United States Patent
Kuwata et al.

[11] Patent Number: 6,151,410
[45] Date of Patent: Nov. 21, 2000

[54] IMAGE PROCESSING APPARATUS, IMAGE PROCESSING METHOD AND MEDIUM FOR STORING IMAGE-PROCESSING CONTROL PROGRAM

[75] Inventors: Naoki Kuwata; Yoshihiro Nakami, both of Nagano, Japan

[73] Assignee: Seiko Epson Corporation, Tokyo, Japan

[21] Appl. No.: 08/969,676

[22] Filed: Nov. 13, 1997

[30] Foreign Application Priority Data

Nov. 19, 1996 [JP] Japan .................................. 8-308392
Jan. 24, 1997 [JP] Japan .................................. 9-011729
Sep. 22, 1997 [JP] Japan .................................. 9-256552

[51] Int. Cl.$^7$ ..................................................... H04N 9/73
[52] U.S. Cl. ............................................ 382/167; 382/162
[58] Field of Search .................................. 358/518–523; 382/162–167

[56] References Cited

U.S. PATENT DOCUMENTS

| | | | |
|---|---|---|---|
| 4,830,501 | 5/1989 | Terashita | 356/402 |
| 4,847,677 | 7/1989 | Music et al. | 358/13 |
| 5,303,071 | 4/1994 | Kakimura | 358/519 |
| 5,357,352 | 10/1994 | Eschbach | 358/518 |
| 5,619,347 | 4/1997 | Taniguchi et al. | 358/516 |
| 5,668,890 | 9/1997 | Winkelman | 382/167 |

FOREIGN PATENT DOCUMENTS

| | | |
|---|---|---|
| 43 09 877 A1 | 10/1993 | Germany . |
| 43 10 727 A1 | 10/1993 | Germany . |
| 1236795 | 9/1989 | Japan . |
| 2541937 | 7/1996 | Japan . |
| 2550186 | 8/1996 | Japan . |

*Primary Examiner*—Thomas D. Lee
*Assistant Examiner*—Stephen Brinich
*Attorney, Agent, or Firm*—Sughrue, Mion, Zinn, Macpeak & Seas, PLLC

[57] ABSTRACT

Traditionally, the operator must determine the type of an image displayed on a screen and manually select one of various kinds of effect processing for the type of the image. As is generally known, however, such operations have a lack of accuracy and are difficult for an untrained user to carry out. In addition, the image is not correctly compensated for color slippages over the entire gradation range. Furthermore, in the case of image data including an abnormal element other than just a color slippage, the image can not be corrected with a high degree of efficiency.

At a step S102, a sample-count distribution of image data is found for each color component by applying a thinning technique on samples. At a step S116, a judgment as to whether or not analogy exists among the sample-count distributions of the color components is formed. A low degree of analogy is regarded as an indicator which suggests that characteristics recognized from the sample-count distributions shall naturally be made uniform among the color components. In this case, the characteristics are compensated for a color slippage included therein by correcting an offset, putting an emphasis on the contrast and correcting the brightness at steps S204 to S216 in order to produce a well pitched and good image from the image data with poor color reproducibility. In addition, since the compensation and correction work is automated, even an untrained user is capable of correcting the balance of color with ease. Furthermore, at a step S205, an offset quantity reflecting a degree of analogy is calculated for use in the compensation of the characteristics for a color slippage.

23 Claims, 21 Drawing Sheets

FIG. 7
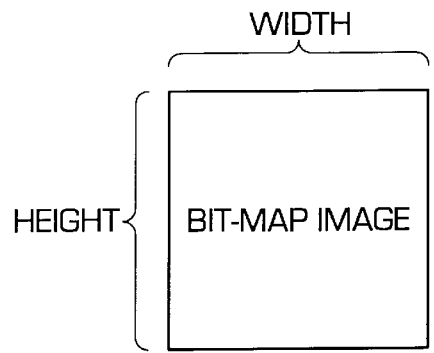
FIG. 8
RATIO = 2
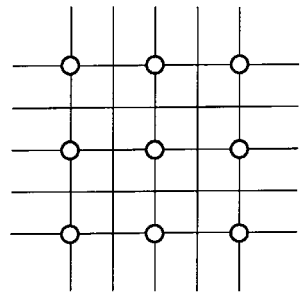
FIG. 10A
FIG. 10B
FIG. 10C
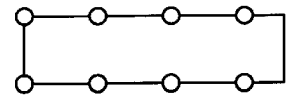
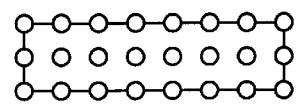
FIG. 11
CNT_R (0)
.
.
CNT_R (255)
CNT_G (0)
.
.
CNT_G (255)
CNT_B (0)
.
.
CNT_B (255)
FIG. 13
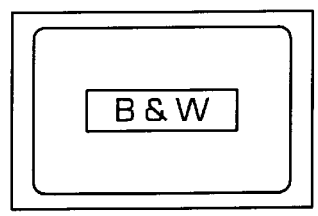
FIG. 14
PICTURE-ELEMENT-COUNT
DISTRIBUTION
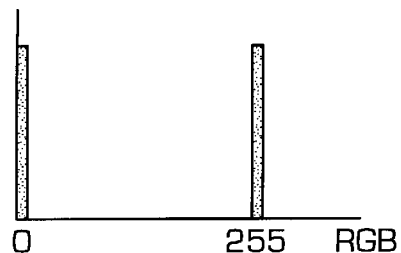

NATURAL PICTURE
BLACK OR WHITE FRAME

DISTRIBUTION FOR A WHITE FRAME
PICTURE-ELEMENT-COUNT DISTRIBUTION OF A NATURAL PICTURE
DISTRIBUTION FOR A BLACK FRAME

WINDOW FUNCTION 1

WINDOW FUNCTION 2

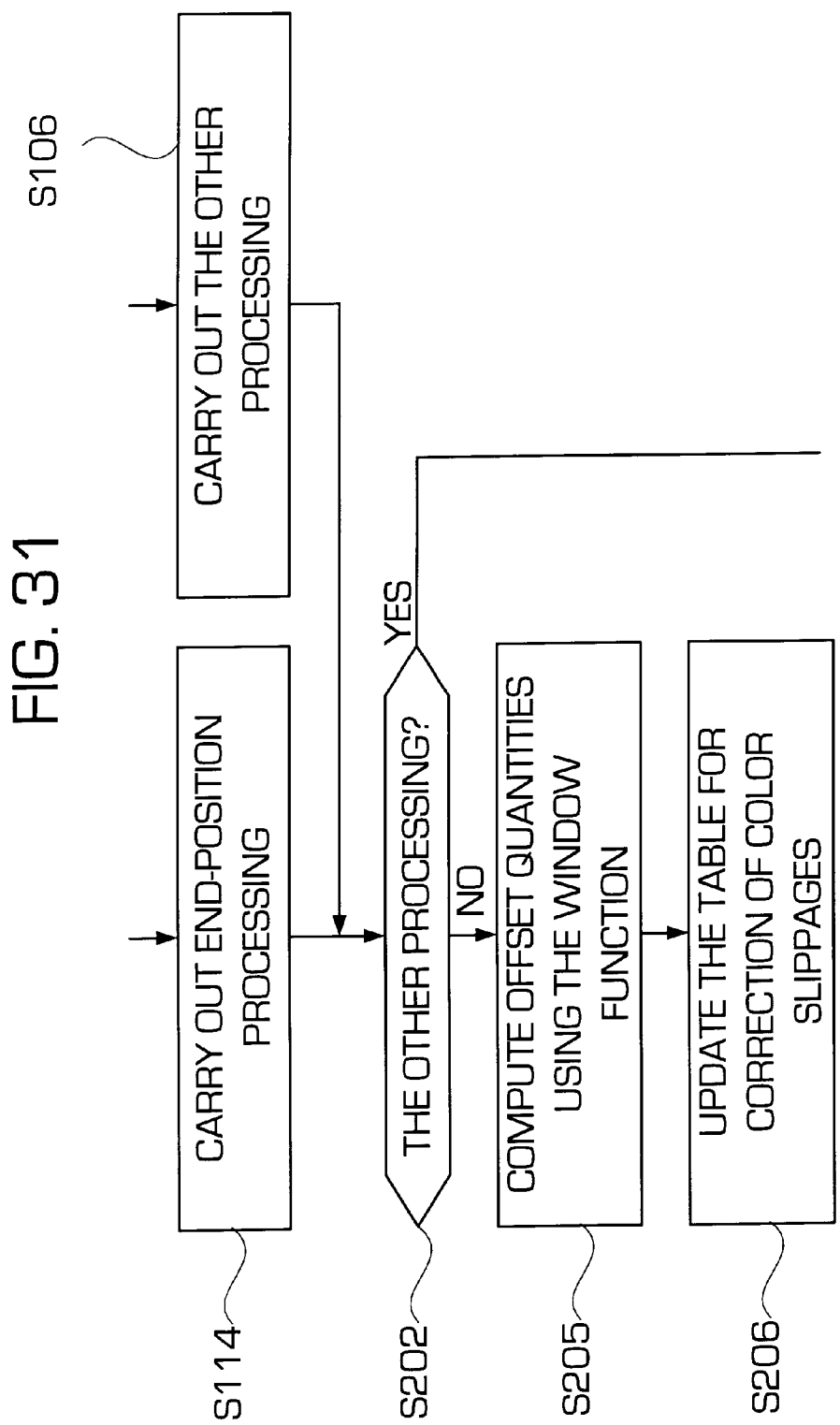

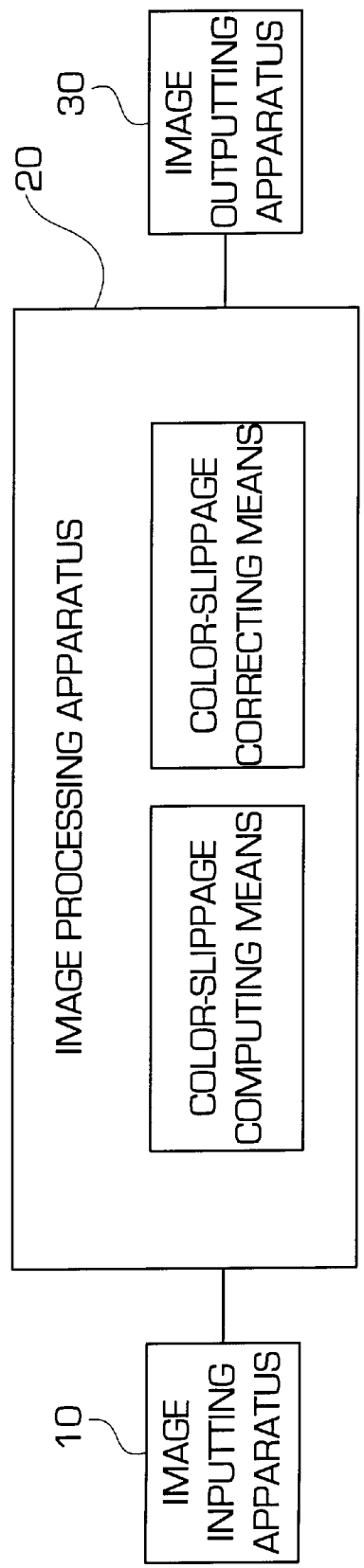

IMAGE PROCESSING APPARATUS, IMAGE PROCESSING METHOD AND MEDIUM FOR STORING IMAGE-PROCESSING CONTROL PROGRAM

BACKGROUND OF THE INVENTION

1. Field of the Invention

In general, the present invention relates to an image processing apparatus, an image processing method and a medium for storing an image-processing control program. In particular, the present invention relates to an image processing apparatus and an image processing method for correcting the balance of color as well as relates to a medium for storing an image-processing control program for the image processing apparatus and the image processing method.

2. Description of the Prior Art

Traditionally, correction of the balance of color in many cases means correction of the so-called color fog or the like. That is, correction of the balance of color implies processing to correct a color slippage observed in equipment such as an image inputting apparatus.

In a digital still camera, for example, image data is output as a gradation-color-specification data of the RGB (red, green and blue) colors. In this case, data with the so-called color slippage due to characteristics of a lens or a CCD device employed in the digital still camera is also observed. An example of the color slippage is a state in which a particular color such as the red color is emphasized more than the color of the real object of observation.

When it is desired to make some compensations of image data for a color slippage thereof by using the conventional image processing apparatus, the data is read by an image processing program and an operator weakens the component value of an emphasized color by carrying out a predetermined operation on a trial-and-error basis.

However, the conventional method for correcting a color slippage has the following problems.

In the first place, carried out by an operator manually on a trial-and-error basis, the correction has a lack of accuracy. For an untrained operator, the correction is difficult to do.

In the second place, since only predetermined component values are increased or decreased in a uniform manner, in some cases, the correction can not be said to be done for all gradations.

Furthermore, if the data contains abnormalities other than just the color slippage, the correction can not be said to be effective.

In addition, it is basically impossible to form a judgment as to whether gradation-color-specification data for each component representing the color of every picture element is correct or not without comparing the color with a standard one. Considering the fact that there are possibly some cases in which it is a matter of course that a component is emphasized by rather an external factor, we can not help saying that it is extremely difficult to automatically form a judgment as to whether or not a color slippage exists.

SUMMARY OF THE INVENTION

Addressing the problems described above, it is thus an object of the present invention to provide an image processing apparatus and an image processing method capable of automating correction of color reproducibility of a color with an abnormality such as the so-called color slippage and also capable of correcting the overall the balance of color, as well as a medium for storing an image-processing control program for the image processing apparatus and the image processing method.

In the image processing apparatus provided by the present invention, predetermined transformation is carried out for converting an input into an output with the balance of color thereof corrected in accordance with an associative relation between the input and the output. To put it in detail, the image processing apparatus inputs each component value of image data which represents an image as a set of picture elements forming a dot matrix by using gradation-color-specification data comprising all but equal color components. The image processing apparatus then carries out the predetermined transformation processing on the input component values. To be even more specific, the image processing apparatus employs a characteristic uniforming means whereby distribution of gradation-color-specification data is found for each color component in order to identify variations among color components and the identified slippages are used as a basis for making the characteristics of color components uniform.

In addition, in the image processing method provided by the present invention, the predetermined transformation is carried out for converting an input into an output with the balance of color thereof corrected in accordance with an associative relation between the input and the output. To put it in detail, the image processing method comprises the step of inputting each component value of image data which represents an image as a set of picture elements forming a dot matrix by using gradation-color-specification data comprising all but equal color components, the step of carrying out the predetermined transformation processing on the input component values, the step of finding distribution of gradation-color-specification data for each color component in order to identify slippages among color components and the step of using identified slippages as a basis for making the characteristics of color components uniform.

Furthermore, an image processing program stored by using a computer in a medium provided by the present invention is used to carry out the predetermined transformation for converting an input into an output with the balance of color thereof corrected in accordance with an associative relation between the input and the output. To put it in detail, the image processing program is used to input each component value of image data which represents an image as a set of picture elements forming a dot matrix by using gradation-color-specification data comprising all but equal color components. The image processing program is then used to carry out the predetermined transformation processing on the input component values. To be even more specific, the image processing program is used to find distribution of gradation-color-specification data for each color component in order to identify slippages among color components and to utilize the identified slippages as a basis for making the characteristics of color components uniform.

With the present invention having a configuration described above, if there is image data which is produced as gradation-color-specification comprising all but equal color components to represent an image as a set of picture elements forming a dot matrix, each component value of the image data is input and the predetermined transformation processing is then carried out on the input component values. That is to say, the predetermined transformation is carried out for converting the input into an output with the balance of color thereof corrected in accordance with an associative relation between the input and the output. In this process, the characteristic uniforming means is used for finding a distribution of gradation-color-specification data for each color component in order to identify slippages among color components and for utilizing the identified slippages as a basis for making the characteristics of the color components uniform.

Let a digital still camera be taken as an example. The traditional correction of the balance of color comprises the steps of forming a judgment as to whether or not a component value of each color is emphasized and adjusting the transformation characteristic of each color component for each picture element to produce a balance of color. According to the present invention, on the other hand, a distribution of gradation-color-specification data is found for each color component and characteristics of color components are identified from the separated distributions of the gradation-color-specification data. An attempt is then made to make the identified characteristics uniform. That is, it has become obvious that, with the characteristics of the distributions of the gradation-color-specification data made uniform for all color components, as an image, a well pitched image having no color slippages can be obtained without regard to the substance of the image. The operation to make the characteristic uniforms is based on the distributions of gradation-color-specification data. It should be noted, however, that the characteristic uniforming is not to be construed as characteristic uniforming in a strict sense. Instead, the characteristic uniforming can be interpreted as an effort to at least set a trend toward uniformity to a certain degree.

Thus, by embracing the concept of making the distributions of components uniform in accordance with the present invention, the formation of a judgment on a color slippage which is basically difficult to judge can be automated, allowing the balance of color to be adjusted more easily. In this case, the scope of the present invention is not necessarily limited to a physically tangible apparatus. Instead, the present invention is also applicable to a method to automate the formation of such a judgment and to adjust the balance of color. That is, the present invention can also be applied to a case in which such a method is implemented by a computer.

In this sense, any distribution is useful as long as the state of the distribution can be recognized for each color component. A variety of statistical techniques including a sample-count distribution can also serve as such a tool. For example, secondary data derived from primary data can even be used as well. Examples of secondary data are a mode, a median and a standard deviation extracted from a sample-count distribution. In this case, a sample-count distribution has a merit that the processing thereof is easy to carry out and can be made simple.

In order to obtain accurate statistical values for all picture elements in a process to find a sample-count distribution described above, however, it takes much labor.

For this reason, it is thus another object of the present invention to reduce the amount of labor to obtain statistical values of a sample-count distribution.

In order to achieve the other object of the present invention described above, a characteristic uniforming means employed in the image processing apparatus provided by the present invention is designed into a configuration wherein only picture elements approximated by the gradation-color-specification data are treated as objects for tabulating a sample-count distribution.

Originally, a color abnormality of an image that can be recognized by a human being by merely looking at the image as a color slippage is an abnormality caused by a color appearing on a portion of the image that should have no color. That is, by looking at a red color only, it is impossible to form a judgment as to whether or not a color slippage exists if the original color is not known. Thus, it is not always necessary to treat all picture elements equally. That is, recognition of variations in characteristic for only picture elements with no color can be said to be an effective way to study balance among colors. For this reason, the characteristic uniforming means forms a judgment as to whether or not pieces of gradation-color-specification data of color components resemble each other for all picture elements. Only if they resemble each other, are they used as objects for finding sample-count distributions. Characteristics are then uniformed by using the sample-count distributions obtained under such a condition as a base.

The judgment as to whether or not pieces of gradation-color-specification data of color components resemble each other can be formed by finding maximum and minimum values of the data and evaluating differences in maximum and minimum among the pieces of gradation-color-specification data. It is quite within the bounds of possibility that data exhibiting extreme values is saturated data which can be excluded from the process to make characteristics uniform.

In this way, according to the present invention, only picture elements approximated by the gradation-color-specification data are picked up to be used in formation of a judgment on characteristics. Accordingly, the present invention is also effective for recognition of variations in characteristic.

On the other hand, there are a variety of concrete methods for making characteristics uniform. As a matter of fact, it is still another object of the present invention to provide a concrete method for making characteristics uniform.

In order to achieve the other object of the present invention described above, a characteristic uniforming means employed in the image processing apparatus provided by the present invention is designed into a configuration wherein a judgment on a characteristic is formed from a predetermined position on a sample-count distribution and the magnitudes of offsets for slippages among color components are found to be used in correction of color-component values in order to make the characteristics uniform.

In the present invention with a configuration described above, in addition to a process to find a sample-count distribution for each color component, positions on a sample-count distributions such as upper and lower ends, an average, a median and a mode are also recognized as well, allowing the characteristic of each color component to be recognized from the sample-count distribution for the color component and the identified positions on the sample-count distribution. Since the recognized characteristic can be considered to be a characteristic wherein slippages among color components result in a real color slippage, the magnitudes of offsets for the slippages can be found to be used in the correction of color-component values.

Thus, according to the present invention, since slippages at the positions of a sample-count distribution are taken into account, the magnitudes of offsets among the color components can be evaluated relatively with ease.

In this case, slippages among color components are found by treating the upper and lower ends at the extreme positions of the range of the sample-count distribution as a characteristic of the sample-count distribution.

If individual sample-count distributions are observed, an extremely large number of different distributions are identified. Nevertheless, even for a diversity of sample-count distributions, the upper-end and lower-end positions thereof can be recognized easily in a uniform manner, allowing a characteristic to be acquired with ease.

As another example, the characteristic uniforming means can also be designed into a configuration wherein a position approximately at the center of a sample-count distribution is judged as the characteristic of the sample-count distribution.

In this case, slippages among color components are found by treating an average value, a median or a mode located approximately at the center position of a sample-count distribution as the characteristic of the sample-count distribution.

Similarly, even for a diversity of sample-count distributions, positions thereof such as an average value, a median or a mode located approximately at the center of a sample-count distribution can be recognized easily in a uniform manner, allowing a characteristic to be acquired with ease. In addition, since slippages at positions with a high distribution density are taken into account, the number of errors generated in the correction of the slippages as a whole is small.

In most of ordinary images, by the way, in spite of the fact that there are differences in absolute value among color components, there are no such big differences in frequency-distribution spreading among them. For this reason, it can be said to be rather natural to have uniformed degrees of frequency-distribution spreading among the color components and, in most cases, non-uniformed degrees of frequency-distribution spreading among the color components are therefore not natural.

For this reason, it is thus a further object of the present invention to solve the unnaturalness of the degrees of spreading of the sample-count distributions.

In order to achieve the further object of the present invention described above, the characteristic uniforming means employed in the image processing apparatus provided by the present invention is designed into a configuration wherein the states of sample-count-distribution spreading of the color components are made all but uniform.

In the present invention with a configuration described above, the states of sample-count-distribution spreading of all color components are recognized and made all but uniform.

As a result, according to the present invention, since the states of sample-count-distribution spreading of the color components are made all but uniform, colors can be generated with a high degree of efficiency for each color component from a number of gradations which are effective for the color component but not effectively utilized, allowing a well-pitched image to be reproduced.

Here, the concept of the frequency-distribution spreading can be interpreted in a variety of ways, making it unnecessary to limit the concept to a particular way of interpretation.

As an example, the characteristic uniforming means can be designed into a configuration wherein the right and left ends of the sample-count distribution are shifted outward in order to widen the spreading within an effective gradation range.

In the present invention with a configuration described above, since the width of a sample-count distribution having a mountain-like shape can be recognized by finding the right and left ends of the bottom of the mountain-like shape, the sample-count distribution is transformed into another one by widening the width within an effective gradation range. If the width of the sample-count distribution is stretched only over a portion of the effective gradation range, for example, the image represented by the sample-count distribution can be said to have a weak contrast. In this case, the spreading of the sample-count distribution of each color component is enhanced, that is, the distribution is widened, so that the width thereof occupies the entire effective gradation range in order to make the characteristics uniform. In this context, a characteristic implies the width of a sample-count distribution. It should be noted that the width of a sample-count distribution does not necessarily mean the actual width thereof. The width of a sample-count distribution may imply a net width obtained by cutting off portions of the sample-count distribution each having a predetermined amount at the right and left ends thereof in order to discard sub-ranges that can cause errors.

As a result, according to the present invention, the spreading of only the remaining part of a sample-count distribution, on which a judgment can be formed with ease, is widened by shifting the right and left ends outward, giving rise to a configuration allowing a judgment to be formed easily.

As another example, the characteristic uniforming means can be designed into a configuration wherein a large number of gradations are allocated to a range with a high distribution density while only a small number of gradations are allocated to a range with low distribution density in accordance with the degree of spreading of the sample-count distribution.

In the present invention with a configuration described above, the characteristic uniforming means finds the degree of spreading of a sample-count distribution for each color component. The degree of spreading is then used as a basis for allocating a large number of gradations to a range with a high distribution density and allocating only a small number of gradations to a range with low distribution density. Much like the width of a sample-count distribution, the concept of frequency-distribution spreading corresponds to the way the sample-count distribution is dispersed. The concept of frequency-distribution spreading can thus correspond to a mathematical quantity such as the standard deviation, the variance or the statistical sharpness. When the degrees of spreading each representing the characteristic of a sample-count distribution are made close to each other in an attempt to make the characteristics of color components uniform, the sample-count distribution of each color component is transformed into one with a portion having a high distribution density is widened to cover an allowable range so that the coincidence among the degrees of spreading of the sample-count distributions, which exhibited slippages among color components, can be verified and, at the same time, in the resulting sample-count distribution of each color component, the effective range is utilized as much as possible with no distribution concentrated only on a portion of the distribution range. As a result, an emphasis is put on the contrast as a whole. It is needless to say that the degree of spreading can be a mathematical quantity other than the standard deviation, the variance or the sharpness. In addition, computation in a strict sense is not required for either mathematical quantity, allowing the processing to be made simple.

As a result, according to the present invention, since the concept of frequency-distribution spreading based on a mathematical technique is embraced, an accurate judgment can be formed.

On the other hand, observation of each color component may indicate that balance of brightness is not established.

For this reason, it is thus a still further object of the present invention to establish the balance of brightness among color components.

In order to achieve the still further object of the present invention described above, the characteristic uniforming means employed in the image processing apparatus is designed into a configuration wherein degrees of brightness of color components are made uniform by manipulating sample-count distributions thereof.

In the present invention with a configuration described above, since non-uniform degrees of brightness among color components may appear as color slippages, the characteristic uniforming means makes the degrees of brightness of the color components uniform by manipulating sample-count distributions thereof. For example, by positioning a sample-count distribution as a whole on the bright side, the image appears bright. By positioning a sample-count distribution as a whole on the dark side, on the other hand, the image appears dark.

As a result, according to the present invention, by making the degrees of brightness uniform among color components, it is possible to avoid a color slippage which results in only a particular highlighted color component.

It is needless to say that the technique of forming a judgment on the whole brightness can be modified properly. In addition, a variety of techniques can be adopted properly as a method of correction for making an image either brighter or darker.

As an example of correcting the brightness, the characteristic uniforming means can be designed into a configuration wherein a gradation located approximately at the center position of the sample-count distribution is compared with a predetermined gradation in order to form a judgment as to whether the image is bright or dark.

In the present invention with a configuration described above, the characteristic uniforming means compares a gradation located approximately at the center position of the sample-count distribution with a predetermined gradation in an effective gradation range in order to form a judgment as to whether the image is bright or dark.

For example, a median gradation obtained during a process to create a sample-count distribution satisfies conditions of being regarded as a gradation located approximately at the center position of the sample-count distribution. By determining whether such a median gradation is higher or lower than a center gradation of the entire gradation range, it is possible to form a judgment as to whether the degree of brightness is high or low.

As a result, according to the present invention, a gradation located approximately at the center position of a sample-count distribution can be used as a criterion to form a judgment as to whether the degree of brightness is high or low with ease.

As an example of an implementation technique for making degrees of brightness uniform, the characteristic uniforming means described above can also be designed into a configuration wherein degrees of brightness of an image are made uniform among color components by $\gamma$ correction based on a result of a judgment on the brightness of the image.

In the present invention with a configuration described above, after a judgment on the brightness of an image has been formed by using a variety of techniques, degrees of brightness of the image are made uniform among color components by $\gamma$ correction based on a result of the judgment. In the case of an image which appears dark, for example, the image as a whole is made brighter by $\gamma$ correction with the $\gamma$ parameter set at a value smaller than unity ($\gamma<1$) to shift the median gradation to a position closer to the center of the entire gradation range. In the case of an image which appears bright, on the other hand, the image as a whole is made darker by $\gamma$ correction with the $\gamma$ parameter set at a value greater than unity ($\gamma>1$) to shift the median gradation to a position closer to the center of the entire gradation range.

As a result, according to the present invention, degrees of brightness are made uniform by changing the brightness through $\gamma$ correction, making the configuration simple by virtue of the wide use of the $\gamma$ correction.

By the way, in some cases, it is rather characteristics of sample-count distributions not matching each other that are natural. In the case of a scene in the evening, for example, it is not unnatural to have only a color pertaining to the red color group. In such a case, it is rather unnatural to uniform characteristics judged from sample-count distributions for color components.

For this reason, it is thus a still further object of the present invention not to make characteristics uniform in an unnatural way.

In order to achieve the still further object of the present invention described above, the characteristic uniforming means employed in the image processing apparatus is designed into a configuration including a correction control means whereby the degree of analogy among sample-count distributions of gradation-color-specification data of color components is found and, if the degree of analogy is found low, the color balance is not corrected.

In the present invention with a configuration described above, the correction control means finds the degree of analogy among sample-count distributions of gradation-color-specification data of color components and, if the degree of analogy is found low, the color balance is not corrected.

In the present invention with a configuration described above, first of all, the correction control means forms a judgment on the degree of analogy among sample-count distributions of gradation-color-specification data of color components. In the case of a scene obtained in the evening with the color system comprising the red (R), the green (G) and the blue (B), sampled-count distributions in favor of only the red color are obtained. The sampled-count distributions for the blue and green colors are reduced considerably. In such a case, it is rather natural to see the non-uniform characteristics of the sample-count distributions and an extremely low degree of analogy among them. Therefore, it is not necessary to make the characteristics of the sample-count distributions uniform. When the color components appear as values in close proximity to an average, on the other hand, the degree of analogy among the sample-count distributions thereof is judged to be high. In such a case, by making the characteristics of the sample-count distributions match each other, the magnitude of a systematic error inherent in the image inputting apparatus can be reduced.

As a result, according to the present invention, since characteristics are not made uniform deliberately for a low degree of analogy among sample-count distributions, it is possible to prevent an unnatural picture from being generated as a result of making characteristics uniform in a case where a slippage in the balance of color is natural.

When forming a judgment on a degree of analogy among sample-count distributions, it is not always necessary to individually compare the distributions for all gradations.

For this reason, it is thus a still further object of the present invention to simplify the way of obtaining a statistical value representing a sample-count distribution.

In order to achieve the still further object of the present invention described above, the correction control means employed in the image processing apparatus is designed into a configuration wherein the gradation range that the gradation-color-specification data can have is divided into a plurality of zones and a judgment on a degree of analogy among color components is formed by comparing portions of a sample-count distribution in the zones with those of other distributions in the corresponding zones.

In the present invention with a configuration described above, the gradation range that the gradation-color-specification data can have is divided into a plurality of zones and a judgment on a degree of analogy among color components is formed by comparing portions of a sample-count distribution in the zones with those of other distributions in the corresponding zones.

As a result, according to the present embodiment, since a judgment on a degree of analogy among color components is formed by comparing portions of a sample-count distribution in the zones with those of other distributions in the corresponding zones, the amount of labor to form a judgment is reduced in comparison with the formation of such a judgment by comparing sample counts for each gradation over the gradation range.

On the other hand, a variety of techniques for forming a judgment on a degree of analogy among sample-count distributions can be adopted. For this reason, it is thus a still further object of the present invention to provide a technique for forming a judgment on a degree of analogy among sample-count distributions with ease.

In order to achieve the still further object of the present invention described above, the correction control means employed in the image processing apparatus is designed into a configuration wherein formation of a judgment on a degree of analogy among sample-count distributions of color components is based on inner products of characteristic vectors each representing one of the sample-count distributions. To put it in detail, the sum of sample counts in each of the zones of a sample-count distribution is used as a member of the characteristic vector representing the sample-count distribution.

It is easy to check a correlation among sample-count distributions of color components by using such inner products. In the technique provided by the present invention for forming a judgment on a degree of analogy among sample-count distributions, inner products of characteristic vectors each representing a correlation among color components are found by treating the sum of sample counts in each of the zones of a sample-count distribution as a member of the characteristic vector representing the sample-count distribution. A highest degree of analogy is indicated by an inner product having a value of unity. For a low degree of analogy, on the other hand, the value of the inner product approaches a zero. In treating the sum of sample counts in a zone of a sample-count distribution as a member of the characteristic vector representing the sample-count distribution, it is not always necessary to take sample-count sums in all the zones as members. Only sample-count sums in some selected zones can serve as members.

As a result, according to the present invention, since formation of a judgment on a degree of analogy among sample-count distributions is based on inner products of characteristic vectors representing the sample-count distributions, such a judgment can be formed with ease.

When making a decision as to whether or not to make characteristics uniform in the case of a low degree of analogy, the decision does not have to be based on selection of one two choices obtained as a result of comparing a degree of analogy with a threshold value. This is because it is quite within the bounds of possibility that the two choices have a discontinuous value on a boundary thereof, making it difficult to select one of them.

For this reason, it is thus a still further object of the present invention to provide a technique for making a decision as to whether or not to make characteristics uniform whereby the decision is not based on selection of one of two choices.

In order to achieve the still further object described above, the image processing apparatus provided by the present invention is designed into a configuration wherein an effective value is provided for making a decision as to whether or not to make characteristics uniform. In the configuration, the correction control means is in essence capable of making a decision as to whether or not to make characteristics uniform by varying the effective value and making the effective value continuously variable.

In the present invention with a configuration described above, the image processing apparatus provides an effective value used in making a decision as to whether or not to make characteristics uniform and the correction control means in essence makes a decision as to whether or not to implement the correction by varying the effective value. A window function is effective for controlling such a decision making mechanism. To put it in more concrete terms, the effective value is multiplied by a window function, the value of which is set at unity when it is desired to implement the correction or at a zero when it is desired not to implement the correction.

Assume that the effective value is in the range 0 to 1. In a region where the effective value changes from 0 to 1 or from 1 to 0, the change maybe non-continuous, often causing the outcome of a judgment on the degree of analogy to subtly vary in accordance with how pieces of gradation-color-specification data are put to use. As a result, a judgment on even on the very same image may produce two outcomes opposite to each other. As a measure taken for countering such a case, the effective value is made continuously variable over such a region by multiplying it by a window function. It is needless to say that the window function can have a variety of forms. In some cases, the window function can exhibit an exceptional behavior such as making the effective value effective in a region with a low degree of analogy. In other cases, the window function can display just an opposite behavior. Of course, the effective value cited above is a value contributing much to the correction. Examples of the effective value are a correction quantity, a compensation quantity and an offset quantity. On the other hand, the value of the window function can be a variable used in a process of manipulating the effective value.

As a result, according to the present invention, it is possible to make discontinuity difficult to appear in a result of the image processing by making the effective value used in uniforming characteristics continuously variable.

Efforts to make characteristics uniform based on sample-count distributions found for color components have been explained so far. However, a more efficient technique for recognizing the characteristics of the sample-count distributions remains to be identified. For this reason, it is thus a still further object of the present invention to recognize characteristics in an efficient way.

In order to achieve the still further object of the present invention described above, the characteristic uniforming means employed in the image processing apparatus is designed into a configuration including a color-slippage computing means for finding a color slippage of gradation-color-specification data from slippages in value among color components in low-brightness and high-brightness zones of the gradation-color-specification data.

It is not easy to recognize which color is emphasized in the gradation-color-specification data described above. This is because, in the case of an image composed of picture elements arranged to form a matrix, the image data of each picture elements has a component value corresponding to the color of the real image so that, by merely looking at each component value, it is impossible to form a judgment as to whether or not a color slippage from the real image exists.

In the present invention with a configuration described above, on the other hand, the color-slippage computing means finds color-component values in low-brightness and high-brightness zones of gradation-color-specification data on the premise that the gradation-color-specification data is composed of all but equal color components. In low-brightness and high-brightness zones of the gradation-color-specification data which mean the black and white colors respectively, the color components should have an equal value so that, in many cases, color components having values different from each other in these zones can be seen as an evidence of a color slippage. For this reason, the values of color components in these zones are compared with each other and a slippage in value among color components can be used to form a judgment that there is a color slippage in the gradation-color-specification data.

As a result, according to the present invention, a color slippage can be found automatically by recognizing a slippage in value among color components in a zone that should naturally have an equal value for all the color components.

Here, gradation-color-specification data composed of all but equal color components is taken as an object of processing. The approximate equality allows the utilization of a property of the gradation-color-specification data exhibiting that the color components have an equal value in the low-brightness and high-brightness zones. As a result, any gradation-color-specification data can be used as an object of processing as long as the data has such a property. This is because, even if there is no readily available equality relation, such a property allows transition to an equal-value environment through predetermined transformation operations. Assume, for example, that gradation-color-specification data of an L*a*b color system is supplied. By performing color transformation of the supplied data into one with color components having an equal relation such as the RGB color components, the technique described above can be applied to the gradation-color-specification data. It should be noted that, in general, the amount of color-transformation processing is large. In the case of the present invention, however, since the processing is limited to some particular zones, that is, the low-brightness and high-brightness zones described above, the amount of the processing can be decreased, allowing the processing to be carried out by using only few resources.

In addition, the processing of a color slippage can be basically positioned at any stage in the flow of the image processing. That is to say, the color-slippage processing can be carried out after other transformation processing, or prior to the other transformation processing so that the other processing can be carried out after elimination of color slippages. It is needless to say that the latter sequence is preferred.

The low-brightness or a high-brightness zone is the so-called colorless zone, a zone in which color components have an equal value. Thus, a zone in which color components have an equal value can be changed properly. For example, the range of gradation-color-specification data of image data is sufficiently narrower than what the range should naturally be. The gradation-color-specification data can undergo transformation processing if the range includes a low-brightness or a high-brightness zone. It is needles to say that, since the existence of a color slippage is set forth as a premise, the word 'equal' used in the statement "the color components have an equal value" is not to be construed to imply the word "coincident" in a strict sense.

As described above, in the low-brightness and high-brightness zones, color components have an equal value. For this reason described, it is thus a still further object of the present invention to find a color slippage with a high degree of accuracy.

In order to achieve the still further object of the present invention described above, the color-slippage computing means employed in the image processing apparatus provided by the present invention is designed into a configuration wherein a color slippage can be found with a high degree of accuracy.

In general, it is the high-brightness zone that is prone to the problem of a color slippage. This is because, in spite of the fact that a color slippage exists in a low-brightness zone, a change in color caused by a difference in value between color components in the low-brightness zone is hardly seen by the eyes of a human being. Thus, by forming a judgment on a color shift cause by a difference in value among color component only in the high-brightness zone, it is possible to recognize a color slippage only in a range that can be seen with ease by the eyes of a human being as a problem caused by the color slippage.

As a result, according to the present invention, by treating only the high-brightness zone as an object of observation, the amount of processing can be reduced and, at the same time, only a color slippage in a more practical zone can be recognized.

As for differences in value among color components in a zone having a predetermined degree of brightness, it will be satisfactory if a color slippage can be found with a high degree of accuracy by recognizing the trend of variations in value for each color components in a range of brightness having a certain width in a broad sense.

For the reason described above, it is thus a still further object of the present invention to find a color slippage with ease.

In order to achieve the still further object of the present invention described above, the color-slippage computing means employed in the image processing apparatus provided by the present invention is designed into a configuration wherein a judgment on the existence of a color slippage is formed by finding a slippage in value among color components for the same degree of brightness.

To put it in detail, for image data with a certain degree of brightness in a high-brightness zone, if an observation of component-color values thereof indicates that the component-color values are not equal to each other, the difference in value among the color components is regarded as a color slippage. By the same token, for image data with a certain degree of brightness in a low-brightness zone, if an observation of component-color values thereof indicates that the component-color values are not equal to each other, the difference in value among the color components is regarded as a color slippage.

As a result, according to the present embodiment, since a judgment on a color slippage is formed by finding a slippage in value among color components for the same degree of brightness, the processing is simple in comparison with processing in which a range of degrees of brightness are treated as an object of the processing.

In addition, it is a still further object of the present invention to pursue a higher degree of universality.

In order to achieve the still further object of the present invention described above, the color-slippage computing means employed in the image processing apparatus provided by the present invention is designed into a configuration wherein, for each color component, a representative value of gradation-color-specification data corresponding to a degree of brightness, for which a color slippage is to be recognized, is found and a difference between the representative value and the degree of brightness is judged to be a color slippage.

Also in this case, much like the configuration of the present invention described above, a color slippage for each color component at a certain degree of brightness is recognized by finding a representative value of each color component. In case there are some pieces of gradation-color-specification data corresponding to the degree of brightness, a value that can be said to be the representative value such as an average value representing the pieces of gradation-color-specification data is calculated. In the case of gradation-color-specification data composed of all but equal color components, if a maximum value exists in a range of values that color components can have, the degree of brightness for the maximum value is also highest and, if a minimum value exists in a range of values that color components can have, the degree of brightness for the minimum value is also lowest. If a color slippage does not exist in the low-brightness and high-brightness zone, a coinciding relation is seen in brightness values among the color components. Thus, by using a difference between the representative value and the brightness value, a judgment on a universal color slippage can be formed.

As a result, according to the present invention, by finding a representative value of gradation-color-specification data corresponding to a certain degree of brightness for each color component, the reliability of the data can be enhanced and, in addition, since a difference between the representative value and the degree of brightness is judged to be a color shift, it is possible to carry out extremely concise processing.

Even if only the low-brightness or high-brightness zone is taken into consideration, at a minimum or maximum degree of brightness among an entire range of values that the brightness can have, the values for all color components are equal to a minimum or maximum sample count, most likely indicating a circumstance as if no color slippage were generated.

For the reason described above, it is thus a still further object of the present invention to detect a color slippage with a high degree of reliability.

In order to achieve the still further object of the present invention described above, the color-slippage computing means employed in the image processing apparatus provided by the present invention is designed into a configuration wherein a brightness distribution of gradation-color-specification data is tabulated, an upper pseudo end is determined at a distance from the upper true end of the reproducible range of brightness so that the sum of sample counts between the upper pseudo end and the upper true end is equal to a predetermined fraction of the total number of all samples, a lower pseudo end is likewise determined at a distance from the lower true end of the reproducible range of brightness so that the sum of sample counts between the lower pseudo end and the lower true end is equal to the predetermined fraction of the total number of all samples and slippages of color-component values at the upper and lower pseudo ends are found.

It is naturally desired to find a slippage in value among color components at the highest or lowest degree of brightness of the gradation-color-specification data. In the real state of the found brightness distribution, however, sample counts at each of the true ends is most likely an extreme value generated by a cause such as noise. In this case, the sample counts at the true ends are equal to the maximum or minimum sample counts which is uniform for all color components, making it perhaps impossible to form a judgment on a slippage. Thus, by using a statistical technique, upper and lower pseudo ends on a tabulated brightness distribution are determined at a distance from the upper and lower true ends of the distribution range respectively so that the sum of sample counts between the upper pseudo and true ends and that between the lower pseudo and lower true ends are each equal to a predetermined fraction of the total number of all samples in order to provide sample counts for comparison among color components in a true sense at the pseudo ends by exclusion of a sample count caused by noise or the like. Accordingly, by finding color slippages at the pseudo ends from color-component values, effects of noise and the like can be removed.

As a result, according to the present invention, with such a degree of brightness at which a color slippage is found, a sample count generated by a cause such as noise can be excluded by a statistical technique, allowing a color slippage to be found with an even higher degree of accuracy.

It is needless to say that, after a judgment on the existence of a color slippage in gradation-color-specification data has been formed in this way, the color-component values of the gradation-color-specification data are corrected in order to absorb the recognized color slippage. In a concrete implementation of the technique for correcting color-component values, the color-component values are corrected individually. As an alternative, a new filter is created to be used in the correction. As another alternative, on the premise that another color transformation is to be carried out, color-component values are corrected by changing the contents of a table used in the other color transformation or parameters used in interpolation processing.

In the correction of color-component values for a recognized color slippage described above, a recognized color slippage does not necessarily match a correction quantity, a quantity by which a color-component value should be corrected.

For example, assume that the recognized color slippage has a value of +20. In this case, theoretically, the color slippage can be eliminated by adding a product of a parameter of −1 and the color slippage to the color-component value to be corrected. In reality, however, the correction of the color-component value is carried out by using a compressed parameter of typically −0.5 instead of the theoretical parameter −1.

For the reason described above, it is thus a still further object of the present invention to obtain an even better result of correction based on a color slippage.

In order to achieve the still further object of the present invention described above, the characteristic uniforming means employed in the image processing apparatus provided by the present invention is designed into a configuration including a color-slippage correcting means whereby a compressed recognized color slippage is used for correcting a color-component value.

A color slippage used in the correction of a color-component value is a color slippage recognized in a low-brightness or high-brightness zone as described above. In some cases, such a color slippage can not be said to be an appropriate correction quantity for each gradation. In order to solve this problem, a color slippage recognized at a predetermined gradation is adapted to other gradation values by adopting a linear technique. It is then an adapted color slippage that is used in the correction of a color-component value.

Assume, for example, that a color slippage +a and a color slippage +b are recognized at a degree of brightness L in the low-brightness zone and at a degree of brightness H in the high-brightness zone respectively. In this case, at a gradation value (L+X) at a distance X from the degree of brightness L, a correction quantity to be used in the correction of a color-component value is expressed by $X * (b-a)/(H-L)+a$. Here, the color slippage is subject to linear interpolation. It should be noted that better correction can be applied to the color slippage. For example, color slippages at a plurality of points are found to be used in non-linear processing to compute a correction value.

As a result, according to the present invention, by applying a compressed color slippage in correction of a color-component value instead of using a detected color slippage in the correction as it is, the result of the correction in a sense of feeling is improved. In addition, since a color-component value is corrected by using a correction quantity adapted to each gradation, a color slippage can be absorbed with a high degree of accuracy.

By the way, according to one aspect of the present invention, such an image processing apparatus is implemented by an embodiment which exists as stand-alone equipment while, according to another aspect of the present invention, the image processing apparatus is implemented by an embodiment incorporated in equipment. In addition, the image processing apparatus can also be implemented by software, hardware or a combination of software and hardware which can each be properly modified.

Assume, as an example, a printer driver wherein image data composed of a dot matrix as represented by gradation-color-specification data comprising all but equal color components is transformed into image data adjusted to printing ink to be printed on a predetermined color printer. Also in the configuration of the printer driver, a statistical quantity representing a sample-count distribution of the gradation-color-specification data is found for each color component, characteristics of the color components are uniformed by using the statistical quantity as a base and image data made uniform in this way is printed.

As described above, the printer driver transforms image data supplied thereto into image data adjusted to printing ink to be printed on a color printer. At that time, a sample-count distribution of the image data is found for each color component and the transformation is carried out so as to uniform characteristics identified from the sample-count distributions among the color components prior to the printing. To put it in detail, the sample-count distributions found for the color components are compared with each other and then corrected so as to make the sample-count distributions uniform. As a result, the balance of color as a whole is adjusted and, at the same time, good component colors are generated from individual picture elements.

In addition, the printer driver for transforming image data supplied thereto as gradation-color-specification data composed of all but equal color components into image data adjusted to printing ink to be printed on a predetermined color printer can be designed into a configuration wherein a color slippage of the gradation-color-specification data is found from slippages in value among color components in low-brightness and high-brightness zones of the image data supplied thereto and color-component values of the gradation-color-specification data are individually corrected to absorb the recognized color slippage.

That is, the printer driver transforms image data supplied thereto into image data adjusted to printing ink to be printed on a color printer. At that time, a color slippage is found in the so-called colorless portions such as the low-brightness and high-brightness zones. Then, color-component values of the gradation-color-specification data are individually corrected so as to absorb the recognized color slippage prior to the printing.

If the concept of the present invention is implemented concretely by software executed in an image processing apparatus, it is a matter of course that the software is most likely made available for use in a recording medium for storing the software.

It is needless to say that the recording medium can be a magnetic recording medium or an optical magnetic recording medium. Even recording medium to be developed in the future can be considered as the recording medium in entirely the same way as the magnetic recording medium or the optical magnetic recording medium. In addition, there is no room at all for a doubt as to the equivalence of a copy-level product such as a primary copy product or a secondary copy product to the recording medium. Furthermore, the present invention will have the same effects even if applied to an application wherein the software is transmitted to the image processing apparatus through a communication line by a software supplying apparatus functioning on the software supplying side.

In addition, the concept of the present invention can be implemented partially by software and partially by hardware to give exactly the same effects. According to one aspect of the present invention, some of the software is embedded in the hardware while the rest is stored in a recording medium to be loaded into the hardware whenever necessary. Furthermore, it is needless to say that the present invention can also be applied to a wide range of image processing apparatuses including a color facsimile machine, a color copy machine, a color scanner, a digital still camera and a digital video camera.

BRIEF DESCRIPTION OF THE DRAWINGS

FIG. 7 is a diagram showing coordinates in an image to be transformed;

FIG. 8 is a diagram showing a sampling period;

FIGS. 10a–c are diagrams each showing a relation between an image to be transformed and picture elements thereof to be sampled;

FIG. 11 is a diagram showing an array of variables for holding picture-element counts used for forming picture-element-count distributions;

FIG. 13 is a diagram showing a black-and-white image;

FIG. 14 is a diagram showing a picture-element-count distribution of a black-and-white image;

FIG. 31 is a flowchart of an image processing program used for adjusting an offset quantity by using a window function;

FIG. 33 is a block diagram showing an image processing system employing an image processing apparatus as implemented by another embodiment of the present invention;

DETAILED DESCRIPTION OF THE PREFERRED EMBODIMENTS

The present invention will become more apparent from a careful study of the following detailed description of some preferred embodiment s with reference to the accompanying diagrams.

First Embodiment

A first embodiment is described by referring to accompanying diagrams as follows.

Figure 1:
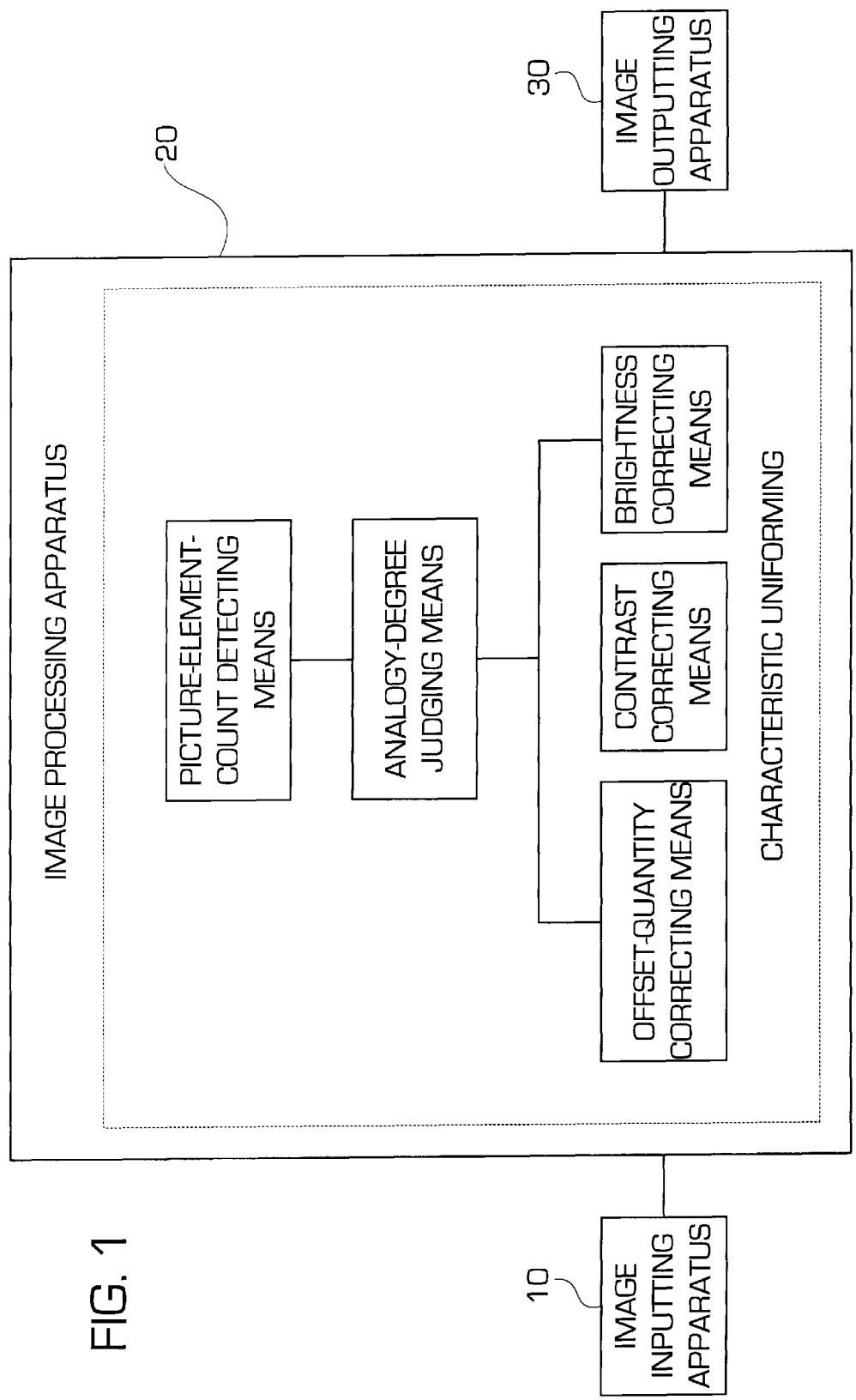
FIG. 1 is a block diagram showing an image processing system employing an image processing apparatus as implemented by the first embodiment of the present invention.
Figure 2:
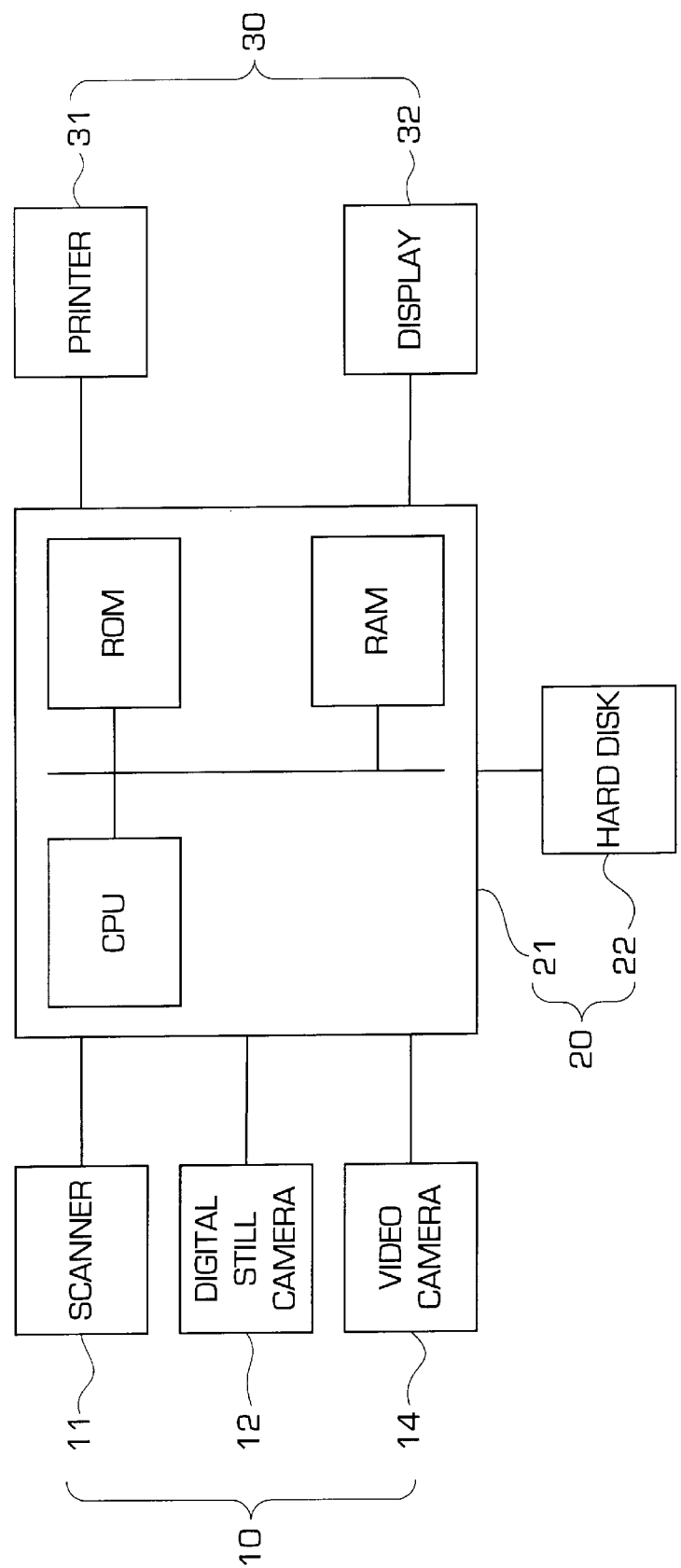
FIG. 2 is a block diagram showing a typical hardware configuration of the image processing apparatus shown in FIG. 1 in concrete terms.

FIG. 1 is a block diagram showing an image processing system implemented by the first embodiment of the present invention and FIG. 2 is a block diagram showing a typical hardware configuration in concrete terms.

As shown in the figures, an image inputting apparatus 10 picks up an image, outputting image data to an image processing apparatus 20. The image processing apparatus 20 carries out image processing on the image data such as uniforming characteristics thereof, outputting results of the image processing to an image outputting apparatus 30. The image outputting apparatus 30 displays an image with the contrast thereof emphasized.

Examples of the image inputting apparatus 10 are a scanner 11, a digital still camera 12 and a video camera 14 whereas typical implementations of the image processing apparatus 20 include a computer system comprising a computer 21 and a hard disk 22. Examples of the image outputting apparatus 30 are a printer 31 and a display unit 32. Of course, the image outputting apparatus 30 can also be implemented by equipment such as a color copy machine or a color facsimile machine in addition to the examples cited above.

In the present image processing system, an attempt is made to correct an image with poor color reproducibility caused mainly by a color slippage. Thus, data produced by the image inputting apparatus 10 such as image data obtained as a result of picking up an image by a scanner 11, image data obtained as a result of picking up an image by a digital still camera 12 or dynamic-image data picked up by a video camera 14 is data to be processed. Such data is supplied by the image inputting apparatus 10 to a computer system which functions as the image processing apparatus 20. It should be noted that, in the case of dynamic-image data supplied by a video camera 14, the processing speed of the computer system may not be high enough for keeping up with variations of the dynamic image. In such a case, an initial condition required for the processing time is set for each scene. By carrying out only image transformation for each frame with the same condition setting in an operation to pick up a dynamic image, the speed problem can thus be solved.

Figure 29:
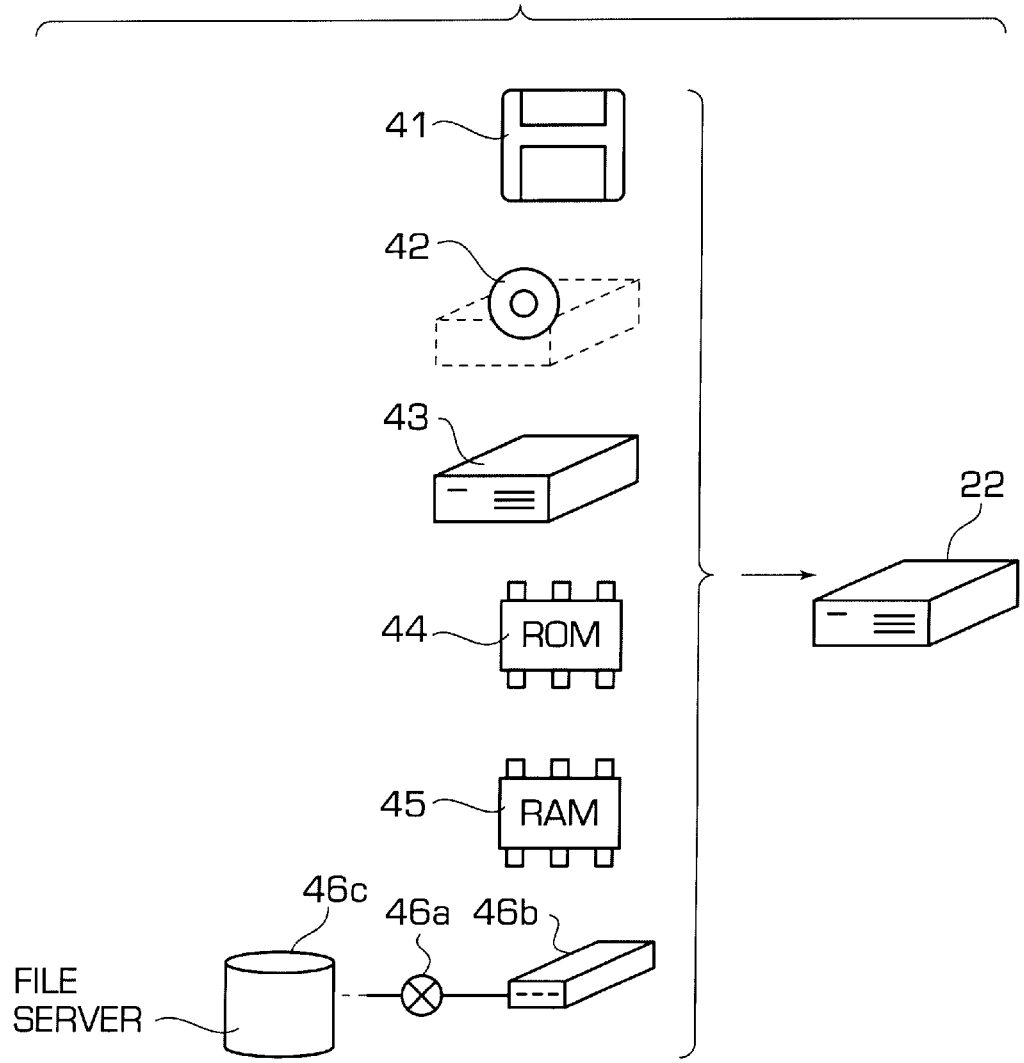
FIG. 29 is a diagram showing ways in which an image processing program is transferred from a recording medium used for storing the program to a hard disk.

The image processing apparatus 20 comprises at least a picture-element count-distribution detecting means for detecting a picture-element-count distribution of each color component, an analogy-degree judging means for judging the degree of analogy among picture-element-count distributions of color components, an offset correcting means for identifying slippages among color components from the picture-element-count distributions in order to make the color components uniform, a contrast correcting means for identifying slippages in degree of contrast among color components from the picture-element-count distributions in order to make the contrasts of the color components uniform and a brightness correcting means for identifying slippages in brightness among color components from the picture-element-count distributions in order to make the brightness amounts of the color components uniform. It is needless to say that, in addition to the means described above, the image processing apparatus 20 may include a color changing means for correcting a difference in color caused by a difference in machine type and a resolution changing means for changing the resolution in accordance with the type of the machine. In this example, the computer 21 uses components such a RAM unit in execution of image processing programs stored in an internal ROM unit and the hard disk 22. In addition to the internal ROM unit and the hard disk 22, these programs can of course be stored in portable storage media such as a flexible disk 41 and a CD-ROM 42 as well as other kinds of storage medium shown in FIG. 29. As shown in FIG. 29, these programs can be installed in a hard disk 43, provided in an IC card having a ROM unit 44 or a RAM unit 45 therein or stored in a storage medium connected to the information processing apparatus 20 through a communication line 46a and communication equipment such as a modem 46b. In the case of the communication line 46a, the other end of the communication line 46a is connected to a file server 46c for supplying certain software.

As an execution result of the image processing program, well pitched image data with corrected color reproducibility to be described later is obtained. The image data obtained in this way is used as a basis for printing the image on the printer 31 serving as the image outputting apparatus 30 or displaying the image on the display unit 32 which is also used as the image outputting apparatus 30. It should be noted that, to put it in concrete terms, the image data is gradation data comprising 256 gradations for each of the RGB (red, green and blue) colors. In addition, the image is data of a matrix of dots arranged to form a lattice shape in the vertical (height) and horizontal (width) directions.

Figure 3:
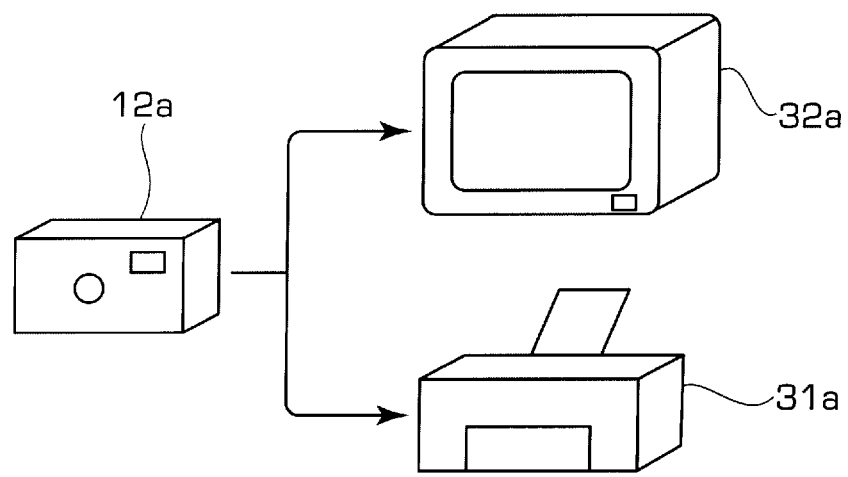
FIG. 3 is a block diagram showing an application of an image processing apparatus provided by the present invention in a simple and plain manner.
Figure 4:
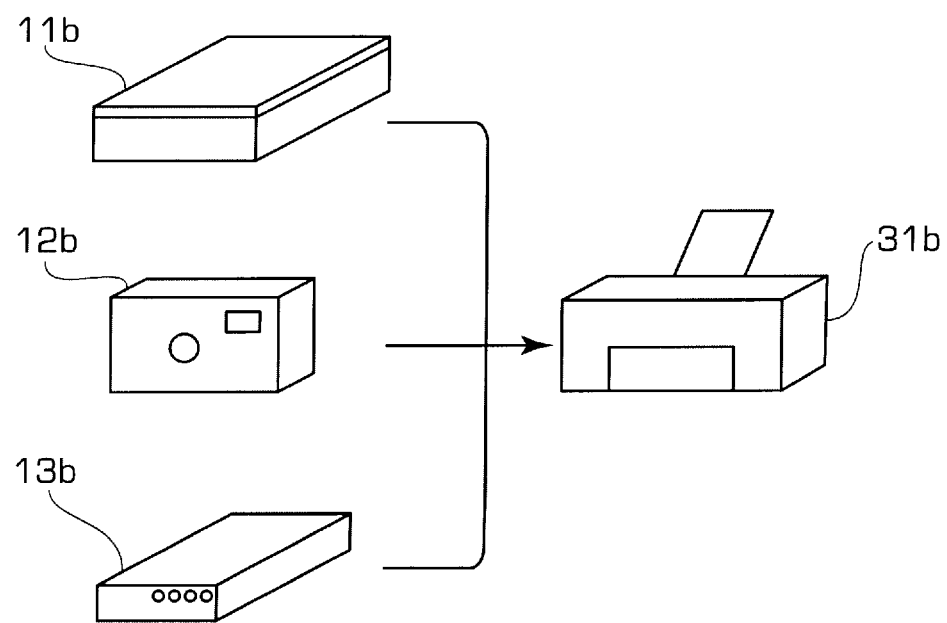
FIG. 4 is a block diagram showing another application of an image processing apparatus provided by the present invention in a simple and plain manner.

In the present embodiment, a computer system is incorporated between the image in putting and outputting apparatuses as described above. It should be noted, however, that a computer system is not necessarily required. For example, FIG. 3 shows an image processing system wherein an image processing apparatus playing a role of correcting color reproducibility or the like is embedded in a digital camera 12a and an image based on transformed image data is displayed on a display unit 32a or printed on a printer 31a. In addition, FIG. 4 shows an image processing system wherein a printer 31b for printing image data supplied thereto directly without passing through a computer system automatically corrects color reproducibility of image data coming from a scanner 11b, a digital camera 12b or a modem 13b.

Figure 5:
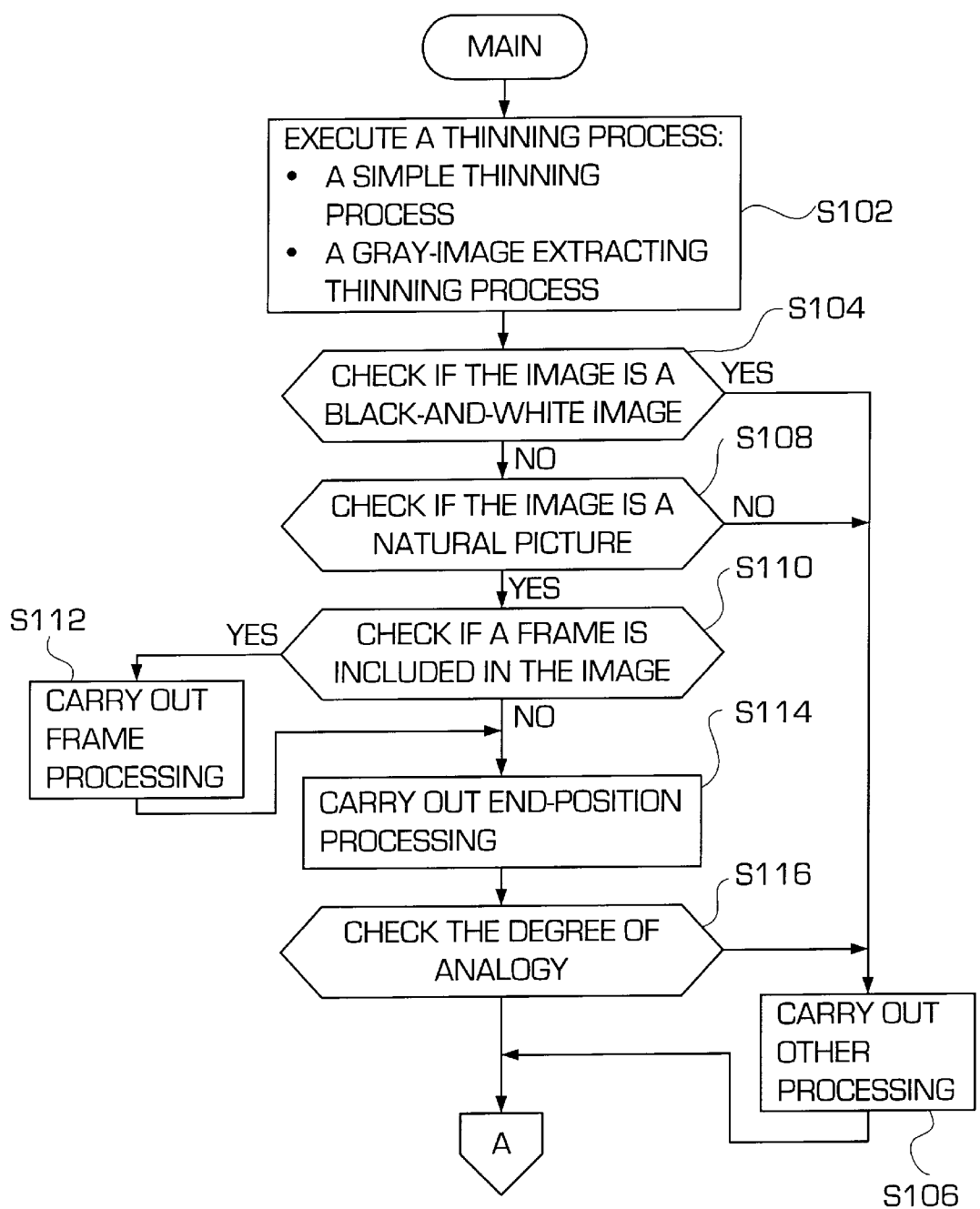
FIG. 5 is a flowchart showing pieces of processing carried out by a picture-element-count-distribution detecting means and an analogy-degree judging means employed in the image processing apparatus provided by the present invention.
Figure 6:
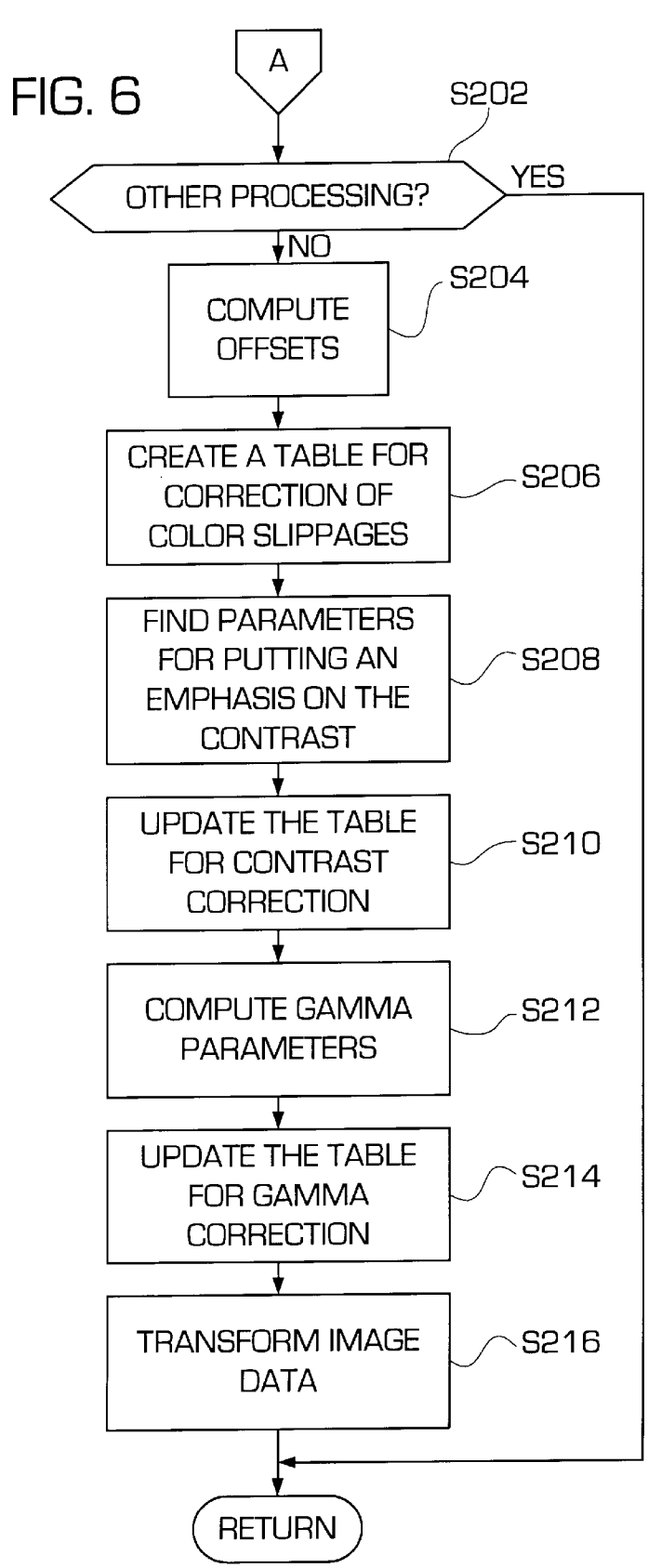
FIG. 6 is a flowchart showing pieces of processing which are carried out by an offset correcting means, a contrast correcting means and a brightness correcting means employed in the image processing apparatus provided by the present invention.

Image processing executed by the computer 21 includes pieces of processing carried out by the picture-element count-distribution detecting means and the analogy-degree judging means shown in FIG. 5. FIG. 6 is a flowchart showing pieces of processing which are carried out by the offset correcting means, the contrast correcting means and the brightness correcting means if the degree of analogy among color components is not small. It should be noted that, in a broad sense, the analogy-degree judging means can be said to include a control means for controlling the effectiveness of processing carried out at a later stage in accordance with the degree of analogy.

FIG. 5 is a diagram mainly showing processing to recognize a picture-element-count distribution for each color component. First of all, picture elements, among which gradations are distributed, are explained.

Even though a distribution among all picture elements can be found, it is not always necessary to find a distribution among all the picture elements since the purpose of finding distribution is to identify a characteristic trend. Thus, it is possible to adopt a thinning technique that may result in an error to a certain degree within an allowable range. As shown in FIG. 5, the flowchart of the present embodiment begins with a step S102 at which a thinning process is carried out to select picture elements, among which distribution of gradations needs to be taken into account. In the case of N samples, a statistical error is about $1/(N^{}(1/2))$ where notation  means involution, that is, an operation to raise N to (½)th power of N. Thus, in order to make the error smaller than 1%, it is necessary to take at least 10,000 samples (N=10,000) or 10,000 picture elements in this case.

Figure 9:
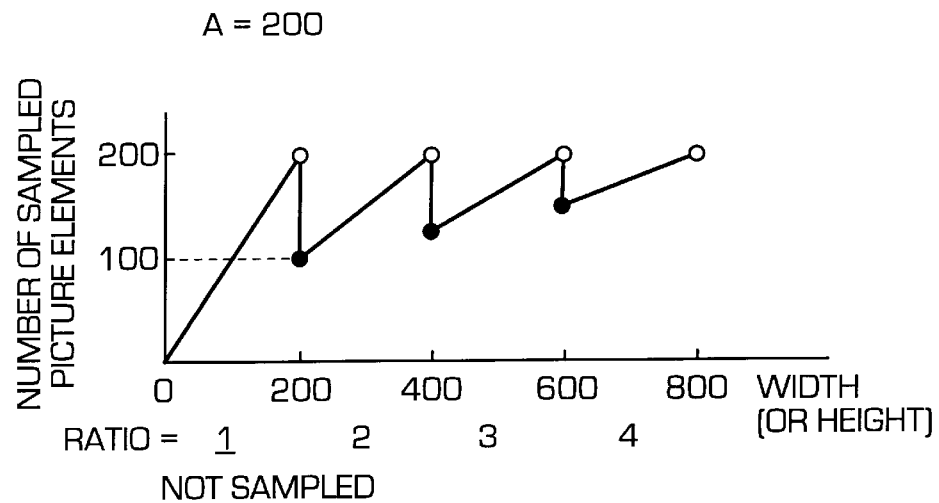
FIG. 9 is a diagram showing sampled-picture-element counts.

In the case of a bit-map image like one shown in FIG. 7, the image is a two-dimensional dot matrix comprising a predetermined number of dots arranged in the vertical direction and a predetermined number of dots arranged in the horizontal direction. This bit-map image thus comprises (Width×Height) picture elements where notation Width is the number of picture elements arranged in the horizontal direction whereas notation Height is the number of picture elements arranged in the vertical direction. A sampling-period ratio is defined by Eq. (1) as follows:

$$\text{Ratio} = \min(\text{Width}, \text{Height})/A + 1 \tag{1}$$

where min(Width, Height) is the smaller one of Width and Height and notation A is a constant. The sampling-period ratio is a ratio of the total number of picture elements to the number of picture elements to be sampled, that is, the number of picture elements, only one of which is taken as a sample. Let an intersection shown in FIG. 8 indicate a picture element and a circle on an intersection shown in the figure denote a sampled picture element. In this case, since sampling is carried out for each two picture elements, the sampling period ratio is 2. That is, one sampling operation is carried out every other picture element arranged in both the vertical and horizontal directions. For A=200, the number of sampled picture elements on a line is shown in FIG. 9.

As is obvious from the figure, except for a sampling-period ratio of 1 for which no sampling (no thinning) is carried out, that is, each picture element is taken into account, in the case of a bit-map image with a width of at least 200 picture elements, the number of picture elements to be sampled is seen to be greater than 100. Thus, in the case of a bit-map image with a width and height each equal to or greater than 200 picture elements, it is necessary to assure that the number of picture elements to be sampled is at least 100×100=10,000 in order to make the error equal to or smaller than 1%.

The reason why min (width, height) is taken as a reference is explained as follows. Consider a bit-map image like one shown in FIG. 10A with width>>height. In this case, if the sampling-period ratio is determined by using the width which is much greater than the height, a large sampling-period ratio or a small number of picture elements to be sampled is obtained. In this case, only picture elements on the two top and bottom lines is most likely extracted in the vertical direction as shown in FIG. 10B. If min (width, height) is taken as a reference, on the other hand, the sampling-period ratio is calculated from the smaller quantity to result in a smaller sampling-period ratio or a larger number of picture elements to be sampled. In this case, picture elements shown in FIG. 10C are to be sampled. As shown in FIG. 10C, even in the vertical direction with fewer picture elements, the thinning technique can be applied to include lines between the top and bottom lines.

It is needless to say that, with respect to picture elements sampled by adopting the thinning technique described above, picture-element counts are found for the 0th to 255th gradations for the R (red) color and stored in an array of variables CNT_R (0) to CNT_R (255) respectively shown in FIG. 11 in order to recognize the picture-element-count distribution for this red-color component. By the same token, picture-element counts are found for the 0th to 255th gradations for the G (green) color and stored in an array of variables CNT_G (0) to CNT_G (255) respectively in order to recognize the picture-element-count distribution for this green-color component. Likewise, picture-element counts are found for the 0th to 255th gradations for the B (blue) color and stored in an array of variables CNT_B (0) to CNT_B (255) respectively in order to recognize the picture-element-count distribution for this blue-color component.

In the example described above, picture-element-count distributions are found by adopting the thinning technique based on an accurate sampling-period ratio for picture elements arranged in the vertical and horizontal directions. It should be noted that this method is also suitable for processing wherein the thinning technique is applied to picture elements which are input sequentially one after another. When applying the thinning technique to a case in which all picture elements have been input, however, picture elements can be selected by specifying their coordinates at random in the vertical and horizontal directions. In this way, for a predetermined minimum required-picture-element count of 10,000, for example, an operation to extract a picture element at random is carried out repeatedly till the 10,000 required picture elements are reached. As the 10,000 picture elements are reached, the operation to extract a picture element is discontinued.

Figure 12:
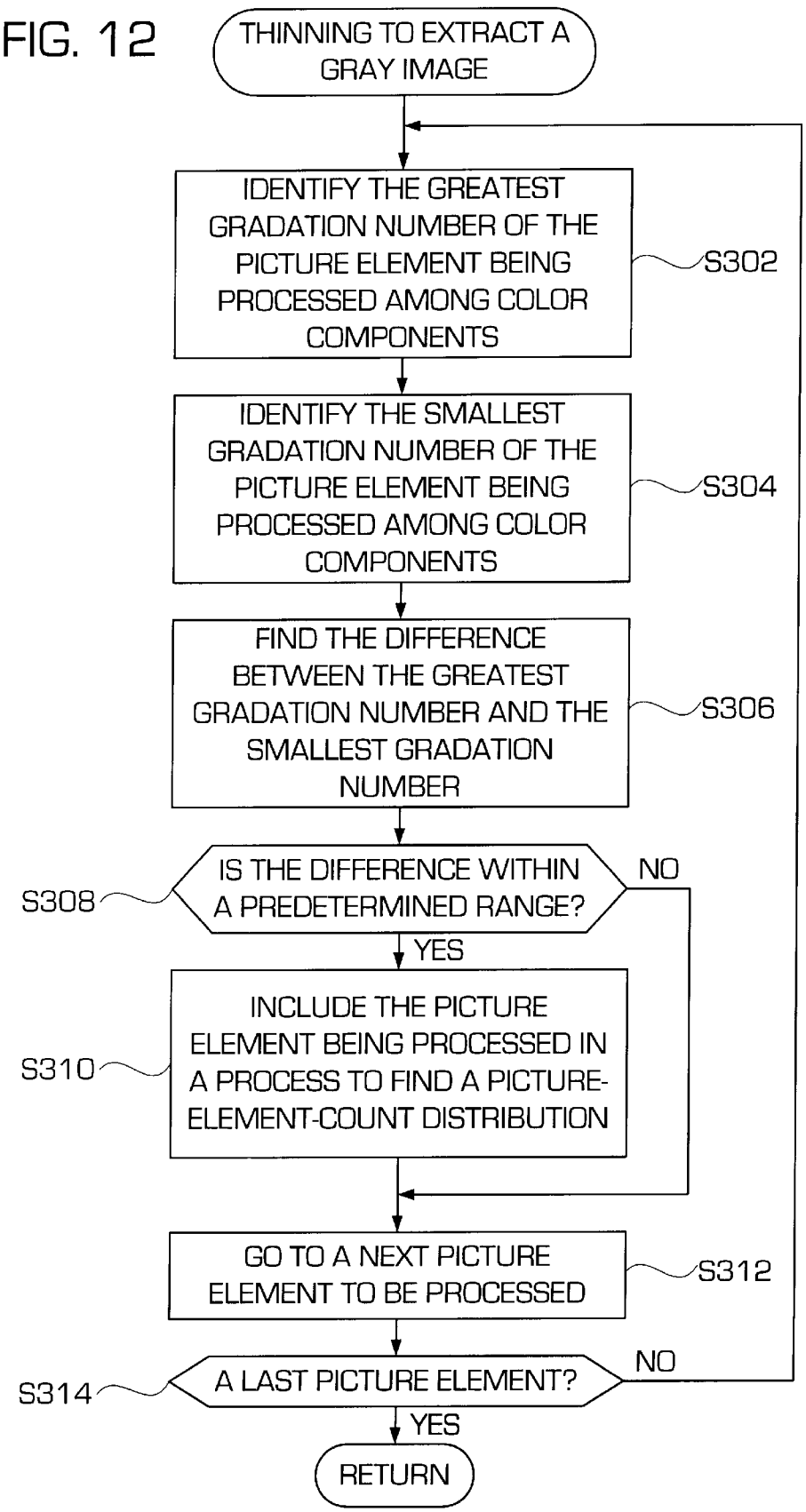
FIG. 12 is a flowchart representing a thinning process to extract gray picture elements.

In addition to a simple thinning process described above in which the thinning technique is adopted by specifying only the number of picture elements to be sampled without specifying which picture elements are to be taken as sampling objects, the thinning technique can be applied by specifying which picture elements are to be sampled. For example, small differences in picture-element count among the RGB color components indicate a color close to the gray. In this case, only gray picture elements can be extracted for finding a picture-element-count distribution. This is because, if only gray picture elements are extracted for comparison of picture-element-count distributions, the color characteristic of an input apparatus can be said to be easily judgeable. FIG. 12 is a flowchart representing a thinning process in which only such gray picture elements are extracted. As shown in the figure, the flowchart begins with a step S302 at which a greatest gradation number of a picture element being processed among color components is identified. The flow of processing then goes on to a step S304 at which a smallest gradation number of the picture element being processed among the color components is identified. Then, the flow of processing proceeds to a step S306 at which a maximum gradation difference, that is, the difference between the greatest gradation number identified at the step S304 and the smallest gradation number identified at the step S302, is found. Subsequently, the flow of processing continues to a step S308 to form a judgment as to whether or not the maximum gradation difference is within a range between predetermined threshold values. Typically, in the case of a picture element close to the gray color, the maximum gradation difference is within a range of 52 contiguous gradations. For a maximum gradation difference within such a range of gradations, the flow of processing goes on to a step S310 to include the picture element being processed in a process to find a picture-element-count distribution among gradations for picture elements in the range of gradations. In the case of a maximum gradation difference exceeding such a range of gradations, on the other hand, the color is determined to be a color other than the gray and the picture element being processed is not used in the calculation of a picture-element-count distribution as a gray color. The flow of processing then proceeds to a step S312 to shift the processing to a picture element to be processed next. Then, the flow of processing continues to a step S314 to find out if all object picture elements have been processed. If all object picture elements have been processed, the processing is ended. If not all object picture elements have been processed, on the other hand, the flow of processing returns to the step S302 to repeat the pieces of processing described so far.

As described above, a picture-element-count distribution among gradations of an image selected by adopting the thinning technique is not necessarily appropriate for correcting the image. It is thus necessary to check the following three cases.

The first case is a case of a binary-data image such as a black-and-white image. That is, it is necessary to determine whether or not the image is a black-and-white image. In the case of a binary-data image including a black-and-white image, the concept of color-reproducibility correction is not appropriate. For a black-and-white image like one shown in FIG. 13, the picture-element-count distribution of each color component is shown in FIG. 14. As shown in FIG. 14, the picture-element-count distribution is polarized at the two ends of a distribution range of gradations. To be more specific, the picture-element-count distribution is polarized at the 0th and 255th gradations.

Thus, a black-and-white image can be checked at a step S104 of the flowchart shown in FIG. 5 by forming a judgment as to whether or not the sum of the picture-element counts for the 0th and 255th gradations is equal to the total number of picture elements selected by adopting the thinning technique and by forming such a judgment for each color component. If the sum of the picture-element counts for the 0th and 255th gradations is equal to the total number of picture elements selected by adopting the thinning technique for each color component, that is, if the image is found to be a black-and-white image, the flow of processing goes on to a step S106 to carry out other processing, that is, processing other than correction of color reproducibility of an image, canceling the processing to recognize a picture-element-count distribution for each color component. In the present embodiment, the processing to correct color reproducibility of an image is divided into two major pieces of processing: front-stage processing to recognize a picture-element-count distribution for each color component and a back-stage processing to actually correct image data. In the other processing carried out at the step S106, a flag is set to indiciate that luminance hanging processing is not to be performed at the back stage, terminating the processing to recognize a picture-element-count distribution for each color component.

Binary data is not limited to black-and-white data. That is, binary data may also be color data. Also in the case of such color binary data, processing to correct the color reproducibility is unnecessary as well. Thus, the state of distribution is examined and, if the state of distribution indicates color binary data, the processing to correct color reproducibility of an image is canceled due to the fact that the data is color binary data as is the case with black-and-white data. If data is composed of two colors, the black and an intermediate color, for example, the picture-element-count distribution for each of the color components is also polarized at two gradations as well. If the two colors are the blue and the green, on the other hand, the picture-element-count distribution for the blue-color component is polarized at two gradations but the picture-element-count distributions for the red and green colors are each concentrated at the 0th gradation. In a word, in the case of binary data, the picture-element-count distribution for a color component is either polarized at two gradations or concentrated at a gradation. Thus, by scanning the variable arrays shown in FIG. 11 to count the number of gradations with a non-zero picture-element count, it possible to form a judgment as to whether or not the image is a binary-data image.

The second case is a case of a business graph or a natural picture such as a photograph. That is, it is necessary to determine whether or not the image is a business graph or a natural picture such as a photograph. It is of course necessary to correct the color reproducibility of a natural picture. In the case of a business graph or a painting, however, it is only natural that there is polarization in colors used therein from the beginning. It is thus impossible to carry out processing to make the characteristics of the color components uniform from sample-count distributions for such an image. For this reason, at a step S108 of the flowchart shown in FIG. 5, a judgment as to whether or not the image is a natural picture is formed.

In the case of a natural picture including shadows, there is a large number of colors. In the case of a business graph or a certain painting such as a drawing, however, there is only a limited number of colors used therein. As a result, an image can be judged to be not a natural picture if only few colors are used in the image. With each of the RGB color components including 256 gradations, 16,700,000 different colors can be expressed. An attempt to accurately determine the number of used colors among the 16,700,000 different colors accurately will require as many array variables as the colors. Such a large number of array variables can not practically be implemented. Since picture-element-count distributions have already been found, however, it is possible to determine which gradations are used effectively in each color component. Thus, the number of colors actually used in a natural picture can be determined.

Figure 15A:
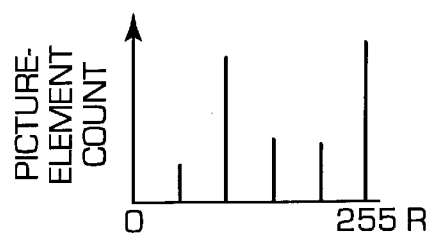
FIGS. 15a–f are diagrams showing picture-element-count distributions of color components of natural and unnatural pictures.
Figure 15D:
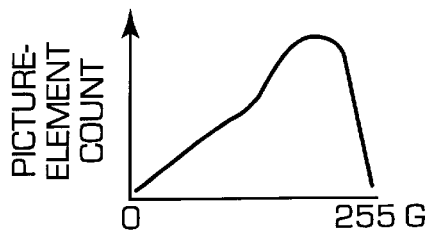
Figure 15B:
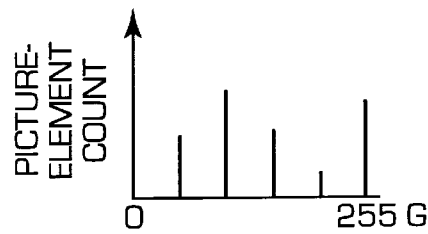
Figure 15E:
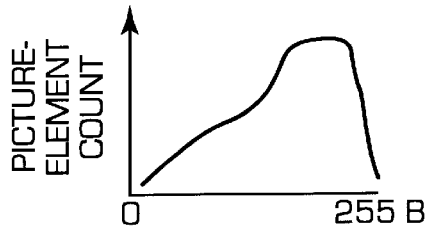
Figure 15C:
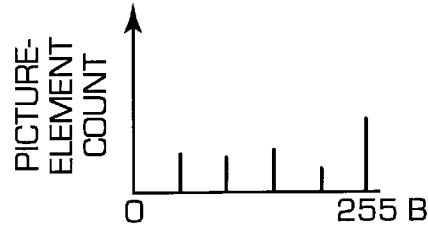
Figure 15F:
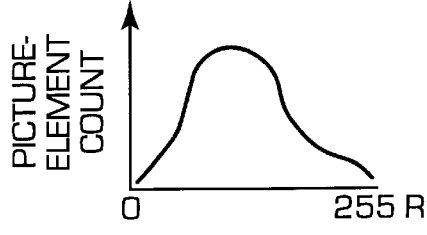

FIGS. 15A to 15C are each a diagram showing an example of a picture-element-count distribution of a business graph. Likewise, FIGS. 15D to 15F are each a diagram showing an example of a picture-element-count distribution of a natural picture. As is obvious from these examples, the picture-element-count distribution of a non-natural picture is a line spectrum. In processing carried out by the computer 21, all the gradations are searched for ones with a non-zero picture-element count and the number of gradations with a non-zero picture-element count is counted and added up for each color component. In the case of a natural picture, the picture-element-count distribution can be considered to be all but uniform over all the gradations for all color components. Thus, the number of gradations with a non-zero picture-element count for the three color components is 768 (=256 per color component×3 color components) in most cases. In the case of a business graph, on the other hand, the number of gradations with a non-zero picture-element count for the three color components is only a number of the order of 60 (=20 per color component×3 color components) even if the number of colors used in each color component is assumed to be as many as 20. Thus, a threshold value of 200 can be used as an appropriate criterion as to whether an image is a natural or a non-natural picture. That is, if the number of gradations with a non-zero picture-element count for the three color components of an image is equal to or smaller than 200, the image can be judged to be a non-natural picture. If the number of gradations with a non-zero picture-element count for the three color components of an image is greater than 200, on the other hand, the image can be judged to be a natural picture. In the case of a non-natural picture, the flow of processing goes on from the step S108 to the step S106 to carry out the other processing as is the case with a binary data image. It is needless to say that the threshold value can be set at a number other than 200.

In addition, it is also possible to form a judgment as to whether or not the picture-element-count distribution is a line spectrum by finding out whether or not gradations each with a non-zero picture-element count contiguous. That is, non-contiguous gradations each with a non-zero picture-element count indicate that the picture-element-count distribution is a line spectrum. To put it in detail, it is also possible to form a judgment as to whether or not the picture-element-count distribution is a line spectrum by examining a ratio of the number of stand-alone gradations each with a non-zero picture-element count to the total number of gradations each with a non-zero picture-element count. The higher the ratio, that is, the higher the number of stand-alone gradations each with a non-zero picture-element count, the more likely the picture-element-count distribution is a line spectrum. Two adjacent gradations each with a non-zero picture-element count are not counted as stand-alone gradations each with a non-zero picture-element count. On the other hand, a gradation with a non-zero picture-element count which is sandwiched by two gradations each with a zero picture-element count adjacent thereto is counted as a stand-alone gradation with a non-zero picture-element count. In this way, the ratio of the number of stand-alone gradations each with a non-zero picture-element count to a total number of gradations each with a non-zero picture-element count can be found. For example, let both the total number of gradations each with a non-zero picture-element count and the number of stand-alone gradations each with a non-zero picture-element count be 64. In this case, the ratio is equal to unity, indicating that the picture-element-count distribution is obviously a line spectrum.

Furthermore, in a case where an image processing program is executed through an operating system, an image file can be recognized by examining an extension appended to the name of the file. The contents of a bit-map file used in particular for storing a photographic image are compressed. In this case, an extension is often appended to the name of a file to indicate a hint as to what technique of compression was adopted for compression of the contents of the file. For example, an extension 'JPG' indicates that a JPEG format has been adopted for compression of the contents of the file. Since the operating system controls the names of files, if a device driver such as a printer makes an inquiry about the name of a file to the operating system, the operating system will return the name of the file including an extension in response to the inquiry. If the extension indicates that the file contains an image of a natural picture, the ordinary processing to correct the color reproducibility of the image is carried out. An extension 'XLS', an extension inherent to a file for storing a business graph, indicates a non-natural picture. In this case, the other processing described above is performed.

Figure 16:
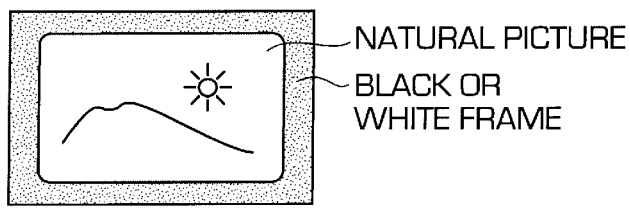
FIG. 16 is a diagram showing an image having a frame on the circumference thereof.
Figure 17:
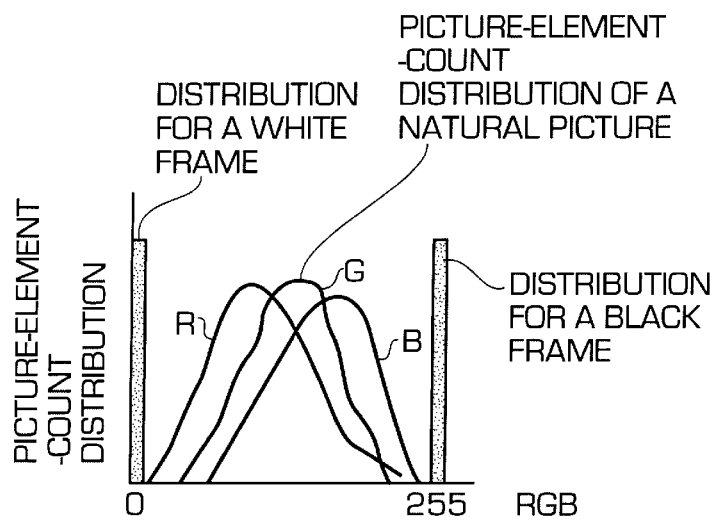
FIG. 17 is a diagram showing picture-element-count distributions of color components of an image having a frame on the circumference thereof.

The third case to be taken into consideration is a case of an image with a frame on the circumference thereof. That is, it is necessary to form a judgment as to whether or not a frame exists on the circumference of an image such as one shown in FIG. 16. If the frame is white or black, the picture-element-count distribution of each color component forms a line spectrum at the two ends of a distribution range of gradations representing the frame and a smooth spectrum for gradations between the two ends corresponding to an internal natural picture enclosed by the frame as shown in FIG. 17.

It is needless to say that, since it is proper to exclude a frame from picture-element-count distribution, the existence of a frame can be checked at the step S108 of the flowchart shown in FIG. 5 by forming a judgment as to whether or not the sum of the picture-element counts at the 0th and 255th gradations is sufficiently large and does not match to the total number of picture elements selected by adopting the thinning technique. That is, if the outcome of the judgment formed at the step S108 is YES, the existence of a frame is confirmed in which case the flow of processing goes on to a step S112 to carry out frame processing. If it is desired not to carry out the frame processing, the picture-element counts at the 0th and 255th gradations of the picture-element-count distribution are reset to zero. In this way, the subsequent processing can be carried out in the same way as a case with no frame.

So far, a black or white frame has been described but a frame may be of another specific color. In the case of a frame of a specific color other than black and white, the picture-element-count distribution of each color component forms a protruding line spectrum at a specific gradation representing the frame and a traditional smooth spectrum for the remaining gradations corresponding to an internal natural picture enclosed by the frame. Thus, a line spectrum having a picture-element count with a big difference from the picture-element counts of the adjacent gradations sandwiching the line spectrum can be interpreted as a frame which can be excluded from the picture-element-count distribution. However, the color of the frame may be used also in an area outside the frame. In this case, the same color as the frame used in an area outside the frame is taken into account by taking an average of the picture-element counts of the adjacent gradations sandwiching the line spectrum representing the frame.

Figure 18:
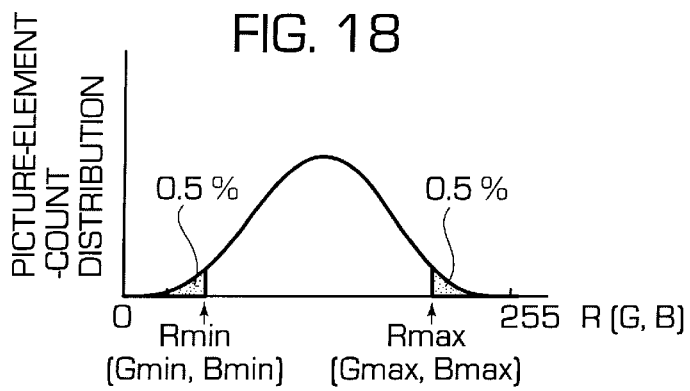
FIG. 18 is a diagram showing a picture-element-count distribution including end portions obtained from end processing of the distribution.

After the first and second cases described above have been taken into consideration at the steps S104 and S108 of the flowchart shown in FIG. 5, the flow of processing may eventually go on to a step S114 instead of proceeding to the step S106 for carrying out the other processing be the picture an image of the third case with a frame or an image with no frame. At the step S114, the picture-element counts at both the ends of the gradation range are found. In many cases, the picture-element-count distribution of a natural picture resembles all but a mountain as shown in FIG. 18. It is needless to say, however, that the position and the shape of the picture-element-count distribution varies from image to image. Statistical observation indicates that, at the bottom of the picture-element-count distribution, the picture-element counts approach a zero unlimitedly as the gradation is shifted toward the ends of the gradation range. Thus, in spite of the fact that it becomes important to identify the two ends of the mountain-like shape of a picture-element-count distribution in an attempt to identify the picture-element-count distribution, in actuality, it is most likely impossible to deny the fact that any picture-element-count distribution having a shape resembling a mountain satisfies the condition that the picture-element counts approach a zero as the gradation is shifted toward the ends of the gradation range. Thus, the ends of the gradation range should be excluded from data for comparing picture-element counts with each other since every picture-element-count distribution has a zero picture-element count at the ends of the gradation range anyway.

For this reason, a gradation with a certain picture-element count close the lower true end of the gradation range (that is, the 0th gradation) and a gradation with a certain picture-element count close the upper true end of the gradation range (that is, the 255th gradation) are taken as lower and upper pseudo-end gradations to replace the gradations with a zero picture-element count at the lower and upper true ends of the gradation range respectively. Only a narrower gradation range sandwiched by the lower and upper pseudo-end gradations is taken into account. That is, gradations between the lower true-end gradation and a lower pseudo-end gradation on the left-hand side of the gradation range and gradations between the upper true-end gradation and the upper pseudo-end gradation on the right-hand side of the gradation range are cut off from a picture-element-count distribution under consideration. In the present embodiment, a pseudo-end gradation is determined to result in a predetermined distribution ratio, a ratio of the sum of picture-element counts for all the cut-off gradations to the total number of picture elements. In the case of the picture-element-count distribution ratio shown in FIG. 18, the lower and upper pseudo-end gradations for the red color are set at Rmin and Rmax respectively, each giving a distribution ratio of 0.5%. It is needless to say that the value of the distribution ratio can be changed properly. By cutting off gradations under and above the lower and upper pseudo-end gradations, which are each set at a predetermined distribution ratio in this way, from a picture-element-count distribution under consideration, it is possible to ignore black and white points generated due to causes such as noise. Conversely, if such processing to exclude gradations under and above the lower and upper pseudo-end gradations from a picture-element-count distribution under consideration is not carried out, that is, if the 0th and 255th gradations are taken as upper and lower end gradations respectively as is the case with most picture-element-count distributions, even one existing black or white point may appear as a picture-element count at an end gradation of the picture-element-count distribution. By cutting off gradations under the lower pseudo-end gradation to take out a sum of picture-element counts equal to 0.5% of the total number of picture elements and gradations above the upper pseudo-end gradation to take out a sum of picture-element counts equal to 0.5% of the total number of picture elements as described above, however, this problem can be solved.

A sum of picture-element counts equal to 0.5% of the total number of picture elements selected by adopting the thinning technique or the total number of picture elements excluding the frame is computed in the actual processing. To put it in detail, a sum of picture-element counts at the upper end of the gradation range is found by sequential cumulation starting with the upper true-end gradation having a minimum picture element count in the picture-element-count distribution, that is, the 255th gradation, toward a gradation having a maximum picture element count. The cumulation is ended at an upper pseudo-end gradation as the sum of picture-element counts reaches 0.5% of the total number of picture elements. By the same token, a sum of picture-element counts at the lower end of the gradation range is found by sequential cumulation starting with the lower true-end gradation having a minimum picture element count in the picture-element-count distribution, that is, the 0th gradation, toward a gradation having a maximum picture element count. The cumulation is ended at a lower pseudo-end gradation as the sum of picture-element counts reaches 0.5% of the total number of picture elements. The upper pseudo-end gradations for the RGB color components are referred to as Rmax, Gmax and Bmax respectively. By the same token, the lower pseudo-end gradations for the RGB color components are referred to as Rmin, Gmin and Bmin respectively.

As described above, it may be rather non-uniform picture-element-count distributions of the RGB color components that represent a natural state. In such a case, the color reproducibility should not be corrected. Tracing back from the results of the observation, it is possible to make a decision that picture-element-count distributions of color components which are similar to each other to a certain degree may conversely need to be made uniform while dissimilar picture-element-count distributions should be kept as they are.

Figure 19:
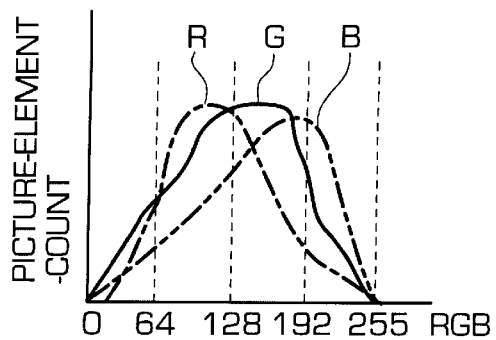
FIG. 19 is a diagram showing a method for extracting members of a characteristic vector from a picture-element-count distribution represented by the vector.

For the reason described above, in the present embodiment, the degree of analogy among the picture-element-count distributions of the color components is checked at a step S116 of the flowchart shown in FIG. 5. Let the picture-element-count distributions of the color components be like ones shown in FIG. 19 and the entire gradation range be divided into four zones: 0th to 63rd gradations, 64th to 127th gradations, 128th to 191st gradations and the 192nd to 255th gradations. Consider a characteristic vector having the picture-element counts in the zones as elements thereof for each color components. Let R be the characteristic vector for the red-color component, r63, r127, r191 and r255 be the elements of the characteristic vector R in the four zones and r_pixel is the total number of all picture elements. In this case, the characteristic vector R for the red-color component is expressed by Eq. (1) as follows:

$$\vec{R} = [r63 \times 100/r\_pixel, r127 \times 100/r\_pixel, r191 \times 100/r\_pixel, r255 \times 100/r\_pixel] \quad (1)$$

By the same token, the characteristic vectors for the green-color and blue-color components can be found. Then, inner products of the characteristic vectors for each two color components are found. To be more specific, an inner product corr_rg of the characteristic vectors for the red-color and green-color components, an inner product corr_gb of the characteristic vectors for the green-color and blue-color components and an inner product corr_br of the characteristic vectors for the blue-color and red-color components are expressed by Eqs. (2), (3) and (4) respectively as follows:

$$\text{corr\_rg} = \vec{R} * \vec{G}/(|R|*|G|) \quad (2)$$

$$\text{corr\_gb} = \vec{G} * \vec{B}/(|G|*|B|) \quad (3)$$

$$\text{corr\_br} = \vec{B} * \vec{R}/(|B|*|R|) \quad (4)$$

An inner product of two characteristic vectors which is also referred to hereafter as a correlation coefficient can be said to represent the degree of analogy of the two characteristic vectors. The greater the value of an inner product, the higher the degree of analogy between two color components represented by two characteristic vectors represented by the inner product. To put it in detail, an inner product has a value in the range 0 to 1. If even one of the inner products corr_rg, corr_gb and corr_br is equal to or smaller than a threshold value CORR which is typically set at 0.7, the degree of analogy is judged to be low. In this case, the other processing is carried out at the step S106 of the flowchart shown in FIG. 5.

In the present embodiment, the processing based on the inner products of the characteristic vectors constitutes the analogy-degree judging means. A method including processing of inner products of characteristic vectors has been established and a judgment can thus be formed with ease. It is needless to say, however, that the method is not limited to the example explained above. For example, while the entire gradation range is divided into four zones in the case of the example, the number of zones into which the entire gradation range is divided can be set at any arbitrary value greater than four. In addition, the degree of analogy can be found by using a statistical technique based on the end positions, the standard deviation and the sharpness of the picture-element-count distribution.

The following is description of a concrete method for finding the degree of similarity by using such a statistical technique. In a typical statistical technique, representative values or variables of a distribution are used. Differences in average value, the absolute values of differences in center value and differences in standard deviation (variance) between the red-color and green-color components, between the green-color and blue-color components and between the blue-color and red-color components are found. Let Ave_rg and Std_rg be the absolute values of the difference in average value and the difference in standard deviation between the red-color and green-color components respectively. In this case, let a performance function between the red-color and green-color components be set as follows:

$$h(rg) = (1 - \text{Ave\_rg}/255) \times (1 - \text{Std\_rg}/255)$$

Likewise, let Ave_gb and Std_gb be the absolute values of the difference in average value and the difference in standard deviation between the green-color and blue-color components respectively. In this case, let a performance function between the green-color and blue-color components be set as follows:

$$h(gb)=(1-Ave\_gb/255)\times(1-Std\_gb/255)$$

Similarly, let Ave_br and Std_br be the absolute values of the difference in average value and the difference in standard deviation between the blue-color and red-color components respectively. In this case, let a performance function between the blue-color and red-color components be set as follows:

$$h(br)=(1-Ave\_br/255)\times(1-Std\_br/255)$$

Distributions similar to each other have all but equal average values, all but equal center values and all but equal standard deviations. Therefore, the differences in variable are each all but a zero, resulting in performance functions h each having a value close to unity. On the other hand, dissimilar distributions exhibit large differences which result in performance functions each having a small value. Thus, by comparing the performance functions with a threshold value found from experiments, it is possible to make a decision as to whether or not correction of color reproducibility is to be carried out. It is needless to say that a center value can be used in the expression of a performance function in place of an average value. At any rate, the performance function is not limited to the expression given above.

When the degree of analogy to a certain extent among the picture-element-count distributions found for the color components from the processing described above has been identified, characteristics of the color components can be judged to be identifiable from the picture-element-count distributions. Then, an attempt is made to establish uniformity among the color components by using the identified characteristics as a basis. It should be noted that, as a result of various judgments described above, in some cases, the other processing is carried out and a flag is set at the step S106 of the flowchart shown in FIG. 5. At a step S202 of the flowchart shown in FIG. 6, the flag is examined. In the case of a flow coming from the step S106 at which the other processing was carried out as evidenced by the set flag, the processing is ended without performing processing to establish uniformity among the color components at steps following S202.

Figure 20:
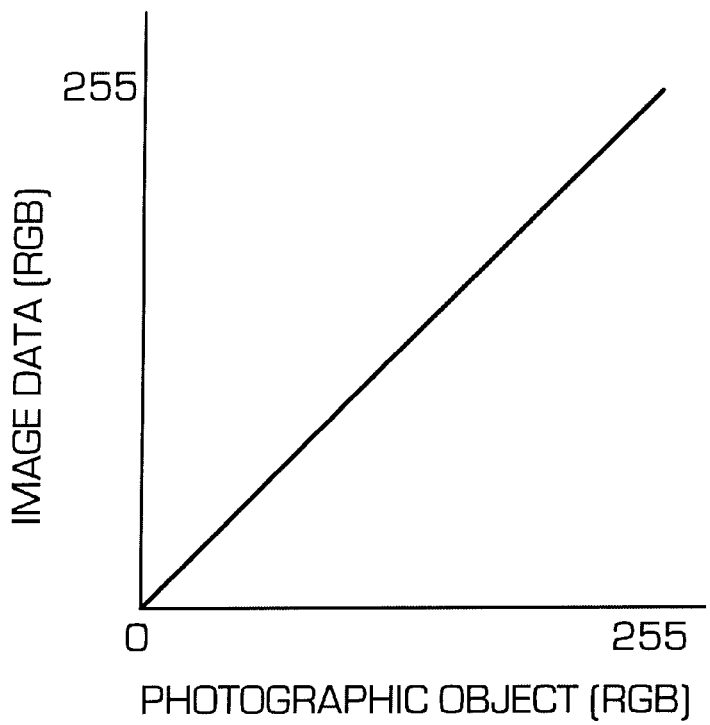
FIG. 20 is a diagram showing a linear relation between RGB color components of a photographic object and the RGB components of image data representing the photographic object.

As shown in the flowchart of FIG. 6, the processing to establish uniformity begins with a step S204 at which an offset is computed and then corrected initially. In a narrow sense, the correction corresponds to correction of a color slippage. An offset for uniforming characteristics is an effective value in the present embodiment. Naturally, there must be a relation of direct proportion between RGB color components of a photographic object and the RGB components of image data representing the photographic object like one shown in FIG. 20. However, a transformation characteristic for each component may be shifted due to properties of an image pickup device. With the conventional image processing technology, such a slippage can not be recognized from an ordinary image. If the picture-element-count distributions taken for the color components are found all but similar to each other, it is on the contrary possible to form a judgment that these picture-element-count distributions should originally match each other. In this case, an offset of a slippage for each color component can be detected.

In the case of the present embodiment, the magnitude of an offset of each color component is found at the step S204. The flow of processing then goes on to a step S206 to create a table for use in correction of a color slippage by taking such offset magnitudes into consideration.

When pieces of RGB gradation data (Rp, Gp, Bp) are used, the overall luminance yp in equipment such as a television receiver is found by using the following equation:

$$yp=0.30*Rp+0.59*Gp+0.11*Bp \tag{2}$$

As is obvious from the above equation, the green-color component has a greatest effect on the luminance. In this sense, correction of slippages of the colors other than the green in relation to the green offers a merit that the image of a picture as a whole does not change.

In order to find slippages in picture-element-count distributions among color components, on the other hand, it is desirable to take a characteristic portion of each of the picture-element-count distributions into consideration. For this reason, in the present embodiment, the upper pseudo-end gradations Rmax, Gmax and Bmax obtained from the end-gradation processing of the step S114 of the flowchart shown in FIG. 5 described above for the red, green and blue-color components respectively are used in conjunction with median gradations Rmed, Gmed and Bmed of the picture-element-count distributions for the red, green and blue-color distributions. The lower and upper pseudo-end gradations are effective in forming a judgment on properties of a distribution. With respect to the lower pseudo-end gradations Rmin, Gmin and Bmin, however, there is a range for which the effect of a slippage is difficult to understand from the beginning. Thus, the lower pseudo-end gradations Rmin, Gmin and Bmin are eliminated deliberately from the process to find and correct slippages in picture-element-count distributions among color components. It is thus possible to make a correction by putting an emphasis only on a slippage which is obtained in a range where the effect of a slippage is big. A median gradation at the center of a distribution with a shape resembling a mountain can be used to indicate the top of the mountain-like shape even if there is a gradation with an extremely large picture-element count. In this case, being a portion having a great effect on the image of a picture, the mountain portion is effective for grasping the characteristic.

From the upper pseudo-end gradations Rmax, Gmax and Bmax as well as from the median gradations Rmed, Gmed and Bmed, slippages dRmax and dRmed between the red and green colors and as well as slippages dBmax and dBmed between the blue and green colors can be found by using the following equations:

$$dRmax=Gmax-Rmax \tag{3}$$

$$dBmax=Gmax-Bmax \tag{4}$$

$$dRmed=Gmed-Rmed \tag{5}$$

$$dBmed=Gmed-Bmed \tag{6}$$

Then, by using the slippages of the red and blue colors relative to the green as references, an offset dR for the red-color component and an offset dB can be found from the following equations:

$$dR=(dRmax+dRmed)/2 \tag{7}$$

$$dB=(dBmax+dBmed)/4 \tag{8}$$

where the following limitation is set: $-12<dR, dB<12$. The limitation is set because, by merely taking picture-elementcount distributions into consideration, there may be a case in which the color reproducibility can by no means be corrected completely. The typical limits used in the limitation prevent a picture-element-count distribution from being much corrected. It is needles to say that the limits are set at proper values which are determined empirically by experiments. The difference in denominator between the expressions on the right-hand side of Eq. (7) and that of Eq. (8) represents a difference in effect between the two colors. By the same token, the denominators can be modified properly to values found empirically by experiments.

Since the quantifies dR and dB found above are no more than offset values, as actual statistical values, new upper pseudo-end and median gradations Rmax2, Bmax2, Rmed2, Bmed2, Rmin2 and Bmin2 are set as follows:

$$Rmax2=Rmax+dR \qquad (9)$$

$$Rmed2=Rmed+dR \qquad (10)$$

$$Rmin2=Rmin+dR \qquad (11)$$

$$Bmax2=Bmax+dB \qquad (12)$$

$$Bmed2=Bmed+dB \qquad (13)$$

$$Bmin2=Bmin+dB \qquad (14)$$

It should be noted that the above equations obviously include offset quantities dR and dB of the red and blue colors respectively relative to the green and do not change according to the gradation value. Thus, in the case of image data on actual picture elements, it is sufficient to just add the offset quantities in a uniform manner.

It is worth noting, however, that correction of image data based on other factors is also carried out in the present embodiment. If pieces of correction are all done individually, however, the processing time becomes long, causing inconvenience. In order to carry out the processing with a high degree of efficiency, at the step S206 of the flowchart the processing shown in FIG. 6 in the present embodiment, a table is created for representing a relation associating gradation data (R1, G1, B1) of the RGB colors prior to transformation with gradation data (R2, G2, B2) of the RGB colors after the transformation. In this way, image data is actually corrected only once in the end.

In the embodiment described above, on the other hand, a degree of analogy is found from inner products of characteristic vectors and the degree of analogy is then compared with a threshold value CORR of 0.7 in order to make a decision as to whether the characteristics are to be uniformed or not. Thus, in a case where the inner products are all but equal to the threshold value, a different outcome of the judgment can most likely be resulted in even for the same image due to an effect of bits added to the circumference thereof.

It is needless to say that, when a decision to uniform characteristics is made, the offset quantities like ones described above are added. When a decision not to uniform characteristics is made, on the other hand, the offset quantities like ones described above are not added. Therefore, there are big differences between quantities sandwiching a threshold value as a result of adding or not adding offsets thereto.

As a method for preventing a result from changing much as described above, the use of a continuously varying window function is effective. Let a variable x defined as follows:

$$x=\min (corr\_rg, corr\_gb, corr\_br) \qquad (141)$$

Figure 30:
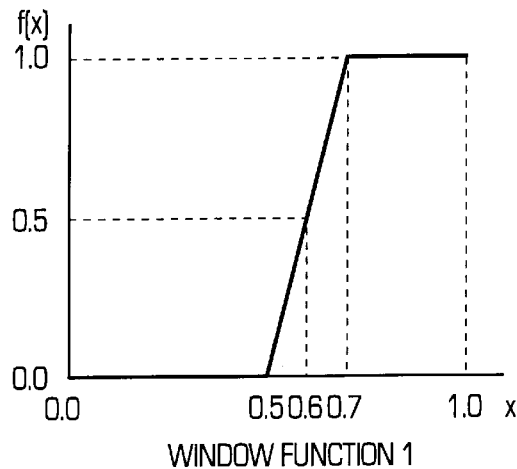
FIG. 30 is a diagram showing a graph representing a state of change in value of a window function used for adjusting an offset quantity.

In this case, a window function f(x) is defined below:

for $x < 0.5$, $\qquad f(x) = 0$, for $0.5 <= x <= 0.7$, $\quad f(x) = 5 * x - 2.5$ and for $0.7 < x$, $\qquad f(x) = 1$ The threshold value CORR is set at 0.5. Changes in value of the window function f(x) are shown in FIG. 30. As shown in the figure, for x<0.5, f(x) has a fixed value of 0. For 0.5<=x<=0.7, f(x) increases linearly from 0 to 1.0 and, for 0.7<x, f(x) again has a fixed value of 1.0. When finding the offset dR for the red-color component and the offset dB for the blue-color component by using Eqs. (7) and (8) as described above, the right-hand expressions are multiplied by f(x) to give Eqs. (7') and (8') as follows:

$$dR=f(x)*(dRmax+dRmed)/2 \qquad (7')$$

$$dB=f(x)*(dBmax+dBmed)/4 \qquad (8')$$

In the flowcharts shown in FIGS. 5 and 6, if the degree of analogy does not exceed the threshold value, the other processing is carried out. With the offsets multiplied by a window function as indicated by Eqs. (7') and (8') described above, processing represented by a flowchart shown in FIG. 31 is carried out. As shown in the flowchart of FIG. 31, if the degree of analogy suggests that the other processing is not to be carried out, the flow of processing goes on to a step S205 at which the offset quantities are computed by using the window function. The offset quantities computed in this way are then used. It is needless to say that, since the value of f(x) abruptly approaches a zero for x<0.7 as described above, an image in close proximity to the threshold value does not change much any more. In addition, with regard to an image with a low degree of analogy, the offsets are each all but a zero, having no bad effects. Furthermore, the new upper pseudo-end and median gradations Rmax2, Bmax2, Rmed2, Bmed2, Rmin2 and Bmin2 can also be found from Eqs. (9) to (14) by using the offset quantities dR and dB calculated in this way.

It is obvious that the window function f(x) is not limited to the one described above. In the example described above, the value of the window function is made variable with the minimum value of the correlation coefficients corr_rg, corr_gb and corr_br used as a base. It should be noted, however, that the change in value of the window function does not have to be based on the minimum value of the correlation coefficients corr_rg, corr_gb and corr_br. For example, the window function can be defined as a function of correlation coefficients corr_rg, corr_gb and corr_br as follows.

$$f(corr\_rg, corr\_gb, corr\_br) \qquad (142)$$

As an alternative, the window function can also be a general function of statistical quantity as follows.

$$f(\text{statistical quantity})$$

where the statistical quantity can be any statistical value such as a minimum value, a maximum value, a median value or a standard deviation.

On the other hand, a window function functions to validate a processed value in a certain area and invalidates another processed value in another area as a window is opened and closed. Now, color fogs can be classified by cause into a color fog caused by hardware performance or the like of the image inputting apparatus 10 described earlier, an intentional color fog resulting from an evening glow or the like and a color fog resulting from special illumination using a light source such as a tungsten lamp. As has been described earlier, it is not necessary to uniform characteristics in the case of an intentional color fog resulting from an evening glow or the like. However, an effort to uniform characteristics in the case of a color fog resulting from special illumination using a light source such as a tungsten lamp is meaningful.

An intentional color fog resulting from an evening glow or the like and a color fog resulting from special illumination using a light source such as a tungsten lamp can be recognized from the correlation coefficients described above. To put it in detail, a photograph with extremely low correlation coefficients can be judged to be caused in many cases by special illumination. In this case, the window function thereof varies as shown in FIG. 32.

A new window function f' (x) has values different from those of the window function f(x) shown in FIG. 30 for x<0.3. To numerically describe the changes in value of the window function f'(x), $$\text{for } x < 0.1, \quad f'(x) = 1.0,$$
$$\text{for } 0.1 \leq x \leq 0.3, \quad f'(x) = -5*x + 1.5 \text{ and}$$
$$\text{for } 0.3 \leq x \leq 0,5, \quad f'(x) = 0.$$

Figure 32:
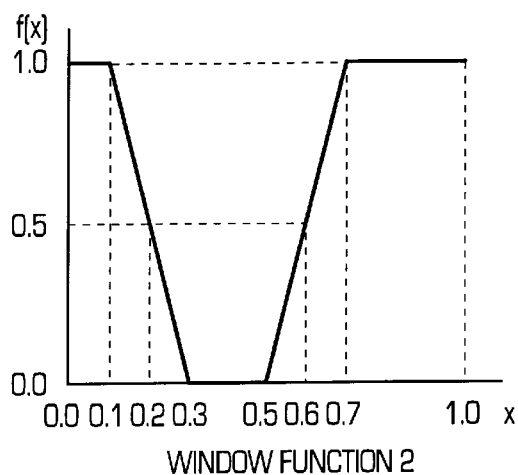
FIG. 32 is a diagram showing a graph representing another state of change in value of a window function used for adjusting an offset quantity.

As shown in FIG. 32, as the variable x decreases from 0.3, the window function f' (x) again increases linearly. As the variable x reaches 0.1, however, the window function f' (x) stays flat at a fixed value of unity. It is needless to say that, with the window function having a value of unity, the large offset quantities computed on the basis of states of picture-element-count distribution for the color components can be used as they are to make the characteristics uniform by eliminating effects of the illumination.

It should be noted that the window function does not have to change linearly in a transition region. That is, in a transition region, the window function can be a curve which exhibits a monotonously increasing or decreasing value.

At the step S116 of the flowchart shown in FIG. 5, the degree of analogy is checked. If the degree of analogy is found low, the flow of processing goes on to a step S106 at which the other processing is carried out and a flag is set. As an alternative, the processing of the step S116 is not carried out in the flowchart shown in FIG. 31 and, by computing the offset quantities by using a window function at the step S205, the processing to uniform characteristics can be in essence by-passed in the case of a low degree of analogy. For this reason, the correction control means can be said to comprise processing software and hardware on which the software is executed.

If there a re big differences in way of spreading among the picture-element-count distributions, on the other hand, the processing to uniform the picture-element-count distributions is effective. In the present embodiment, while the ways in which the picture-element-count distributions spread are being uniformed, the picture-element-count distributions are widened as much as possible in order to put an emphasis on the contrast of each of the color components.

In the transformation processing to put an emphasis on the contrast of each of the color components in the gradation range 0 to 255, color components (R2, G2, B2) of the gradation data after transformation are found from color components (R1, G1, B1) of the gradation data prior to transformation, the upper pseudo-end gradations Rmax2, Gmax and Bmax2 of the components and the lower pseudo-end gradations Rmin2, Gmin and Bmin2 of the components by using the following equations:

$$R2 = far \times R1 + fbr \quad (15)$$
$$G2 = fag \times G1 + fbg \quad (16)$$
$$B2 = fab \times B1 + fbb \quad (17)$$

where $$far = 255/(Rmax2 - Rmin2) \quad (18)$$
$$fag = 255/(Gmax - Gmin) \quad (19)$$
$$fav = 255/(Bmax2 - Bmin2) \quad (20)$$
$$fbr = -far \times Rmin2 \text{ or } 255 - far \times Rmax2 \quad (21)$$
$$fbg = -fag \times Gmin \text{ or } 255 - fag \times Gmax2 \quad (22)$$
$$fbb = -fab \times Bmin2 \text{ or } 255 - fab \times Bmax2 \quad (23)$$

Figure 22:
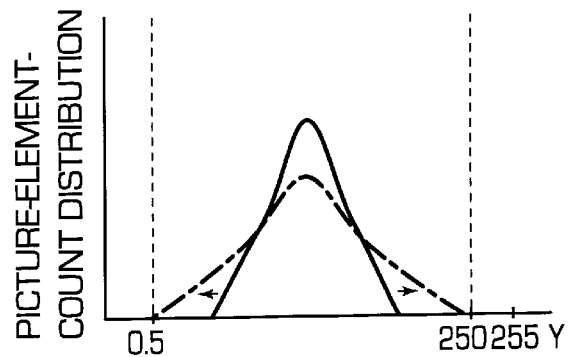
FIG. 22 is a diagram showing an enlarged gradation range and a full gradation range of picture-element-count distributions.

In the equations described above, for R2, G2 and B2<0, R2, G2 and B2 are each set at a zero. For R2, G2 and B2>255, on the other hand, R2, G2 and B2 are each set at 255. Notations far, fag and fab can each be said to be represent a gradient whereas notations fbr, fbg and fbb can each be said to represent an offset. By using the transformation equations described above, a picture-element-count distribution having a small width can be widened to a reproducible range as shown in FIG. 22. It should be noted that, in enlargement of a distribution range of luminance, basically, the total number of picture elements does not change. Therefore, the area of the histogram also remains unchanged as well. In an attempt to enlarge a distribution range of luminance by utilizing the reproducible range to its maximum, however, a high-light portion turns white to come off while a high-shadow portion becomes a destroyed black one. In order to avoid this problem, in the present embodiment, the gradation range to be enlarged is limited. To put it in detail, as a range not to be enlarged, five gradations are left in each of the upper and lower ends of the whole gradation range. As a result, the parameters used in the transformation equations are expressed by the following equations:

$$far = 245/(Rmax2 - Rmin2) \quad (24)$$
$$fag = 245/(Gmax - Gmin) \quad (25)$$
$$fav = 245/(Bmax2 - Bmin2) \quad (26)$$
$$fbr = 5 - far \times Rmin2 \text{ or } 250 - far \times Rmax2 \quad (27)$$
$$fbg = 5 - fag \times Gmin \text{ or } 250 - fag \times Gmax2 \quad (28)$$
$$fbb = 5 - tab \times Bmin2 \text{ or } 250 - tab \times Bmax2 \quad (29)$$

By using the above parameters, gradations below the 5th gradation and those above the 250th gradation are not subject to transformation.

As described above, in the present embodiment, in order to sustain the high-light and high-shadow portions, a sub-range of five gradations starting from the lower true end of the gradation range and a sub-range of five gradations starting from the upper true end of the gradation range are each set as a non-enlargement area in a uniform manner. It should be noted, however, that in the case of an image outputting apparatus whereby the high-light and high-shadow portions are relatively easy to reproduce, the sub-ranges can be made narrower. In the case of an image outputting apparatus whereby the high-light and high-shadow portions are relatively difficult to reproduce, on the other hand, the sub-ranges can be made wider. In addition, instead of treating each of such sub-ranges as a non-enlargement area in a uniform manner, the enlargement factor is gradually limited as transition is made along the gradation range toward the upper and/or lower true ends.

Figure 23A:
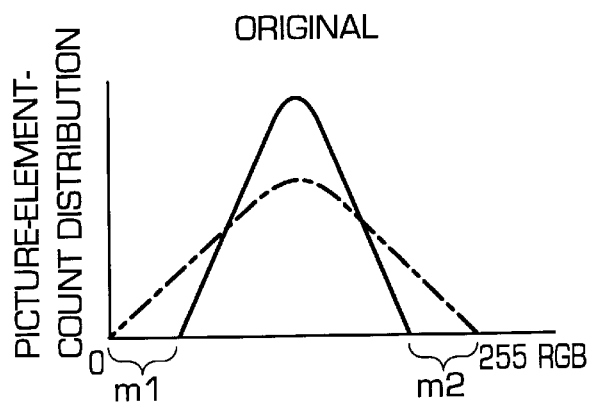
FIGS. 23a–23b are diagrams each showing a case in which limits are imposed on the enlargement factor of the contrast of an image.

FIG. 23A is a diagram showing a narrow luminance distribution of an image. If the enlargement factors (corresponding to the parameters far, fag and fab) of the luminance distribution are applied as described so far, extremely large enlargement factors adjusted to a reproducible range may result. In this case, in spite of the fact that it is natural to have a narrow contrast range from the brightest portion to the darkest portion in the state of a dark sunset such as an evening, as a result of much enlarging the contrast range of the image, the image is most likely transformed into an image of a day time. Since such a transformation is not desired, a limit is imposed on each of the enlargement factors. To be more specific, the parameters far, fag and fab are each limited to a value not exceeding the range 1.5 to 2.0. In this way, a dark sunset will be expressed as a dark sunset in its own right.

Figure 23B:
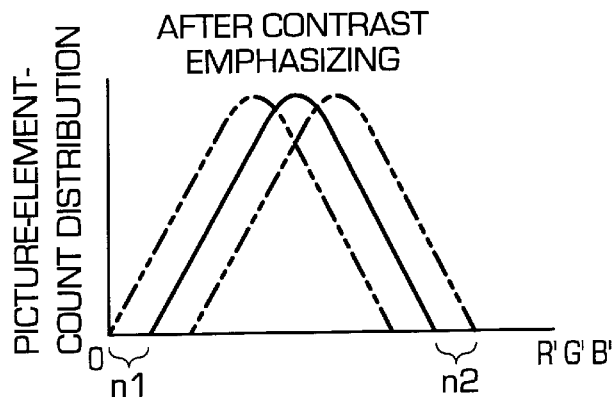

A case in which the enlargement factors are not limited is shown by a single-dotted line in FIG. 23A with no excess portions left in the reproducible range after transformation. If the enlarged range is limited, however, freedom to select a place to which the distribution after transformation is to be brought is obtained as shown by double-dotted lines in FIG. 23B. In some cases, the image as a whole most likely becomes too bright or too dark. Thus, in such a case, transformation is carried out so that the ratio (m1:m2) of an excess portion left at the upper end of the gradation range to an excess portion left at the lower end of the gradation range prior to transformation is equal to the ratio (n1:n2) of an excess portion left at the upper end of the gradation range to an excess portion left at the lower end of the gradation range after transformation.

Figure 21:
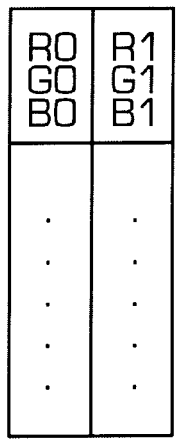
FIG. 21 is a diagram showing a transformation table used for carrying out transformation of image data based on picture-element-count distributions.

As described above, processing to find the parameters far, fag, fab, fbr, fbg and fbb is carried out at a step S208 of the flowchart shown in FIG. 6. The flow of processing then goes on to a step S210 at which a transformation table is created as is the case with the processing carried out at the step S206. FIG. 21 is a diagram showing a transformation table. The component values (R2, G2, B2) of gradation data after transformation in the table created at the step S206 are now used as component values (R1, G1, B1) of the gradation data prior to transformation. To put it in more detail, the existing component values (R2, G2, B2) of gradation data after transformation in the table created at the step S206 are input to find new component values (R2, G2, B2) of gradation data after transformation by using Eqs. (15) to (17). The new component values (R2, G2, B2) are then used to replace the existing component values (R2, G2, B2). In this way, by referencing the transformation table updated at the step S210, two pieces of processing, that is, addition of the offset quantities found at the step S204 and the processing to put an emphasis on each of the contrasts found at the step S208 are implemented at the same time.

Figure 24:
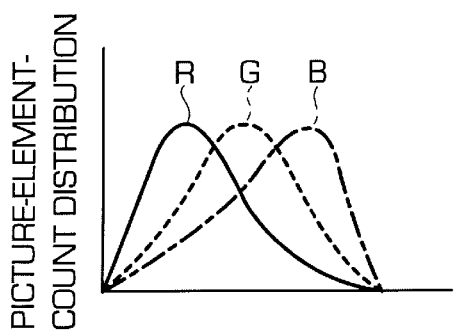
FIG. 24 is a diagram showing picture-element-count distributions of color components required for uniforming the brightness.

As another slippage in picture-element-count distribution among color components, on the other hand, the overall brightness remains to be taken into consideration. For this reason, in order to carry out γ correction to make brightness slippages uniform at a step S214 of the flowchart shown in FIG. 6, the values of γ is found at a step S212. For example, if the mountain-like shape of the picture-element-count distribution for the red-color component shown by a solid line in FIG. 24 inclines to the dark side as a whole while the mountain-like shape of the picture-element-count distribution for the blue-color component shown by a single-dotted line in the same figure inclines to the bright side as a whole, correction and shifting are done so that the picture-element-count distribution of the green-color component as a whole forms a centered mountain-like shape as shown by a dashed line in the same figure.

As a result of carrying out a variety of experiments, in the present embodiment, a judgment on an image is formed with a median gradation of the picture-element-count distribution of the image used as a reference is far as γ correction is concerned. If the median gradation is lower than the 85th gradation, the image is judged as dark. In this case, γ correction is carried out by using v values found as follows.

$$\gamma r = Rmed2/85 \tag{30}$$

$$\gamma g = Gmed/85 \tag{31}$$

$$\gamma b = Bmed2/85 \tag{32}$$

or $$\gamma r = (Rmed2/85)^{**}(\tfrac{1}{2}) \tag{33}$$

$$\gamma g = (Gmed/85)^{**}(\tfrac{1}{2}) \tag{34}$$

$$\gamma b = (Bmed2/85)^{**}(\tfrac{1}{2}) \tag{35}$$

In this case, if the values of γ r, γ g and γ b are smaller than 0.7, γ r, γ g and γ b are set at a value of 0.7. This is because, if such a limit is not set, a night image will be transformed into one like a day-time image. It should be noted that, if an image becomes too bright, the image as a whole becomes whitish, easily turning into an image with a weak contrast. In this case, processing such as putting an emphasis by adjustment of the chroma or processing based on saturation is appropriate.

If the median gradation is higher than the 128th gradation, on the other hand, the image is judged as bright. In this case, γ correction is carried out by using γ values found as follows.

$$\gamma r = Rmed2/128 \tag{36}$$

$$\gamma g = Gmed/\mathbf{128} \tag{37}$$

$$\gamma b = Bmed2/128 \tag{38}$$

or $$\gamma r = (Rmed2/128)^{**}(\tfrac{1}{2}) \tag{39}$$

$$\gamma g = (Gmed/128)^{**}(\tfrac{1}{2}) \tag{40}$$

$$\gamma b = (Bmed2/128)^{**}(\tfrac{1}{2}) \tag{41}$$

Figure 25:
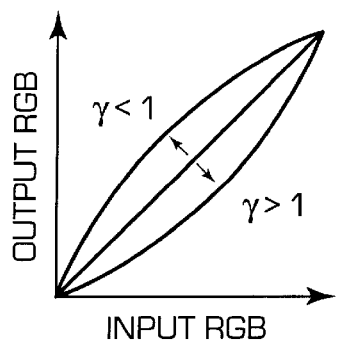
FIG. 25 is a diagram showing transformation relations between the input and the output of γ correction.

In this case, if the values of γ r, γ g and γ b are greater than 1.3, γ r, γ g and γ b are set at a value of 1.3. This is because, if such a limit is not set, the image can become too dark. It should be noted that, if the image becomes too dark, the amounts of color becomes excessive, causing the image to look deep. In this case, processing such as weakening the chroma emphasis through adjustment is proper. It should be noted, however, that for photographic objects with a bright background, such processing to darken the image on the contrary has a bad effect in some cases. This is because, for scenery pictures with the sky occupying half thereof or commemoration pictures taken on a clear day, for example, the face of a person therein may in many cases be more or less depressed in darkness due to counter-light, that is, light from a source behind the photographic object propagating toward the camera, even if no processing to darken the image is carried out at all. For such images, dark and bright portions are mixed so that, when the standard deviation for each color component is found, a relatively high value of the standard deviation is obtained in many cases. Thus, in the case where such a standard deviation is greater than 70, it is possible to exclude the γ processing to make the image dark. An associative relation for a case in which the γ processing is carried out is shown in FIG. 25. As shown in the figure, for γ r, γ g and γ b smaller than unity, an upward-convex curve is obtained but, for γ r, γ g and γ b greater than unity, on the other hand, an downward-convex curve is resulted in. It should be noted that the correction of brightness does not have to be based on a picture-element-count distribution. That is, brightness can also be evaluated from other elements prior to correction.

γ correction using γ r, γ g and γ b determined as described earlier is carried out in accordance with the following equations. Gradation values R1, G1 and B1 prior to transformation are transformed into gradation values R2, G2 and B2 after transformation as follows:

$$R2=255*(R1/255)**\gamma r \tag{42}$$

$$G2=255*(G1/255)**\gamma g \tag{43}$$

$$B2=255*(B1/255)**\gamma b \tag{44}$$

It should be noted that this γ correction is also executed for the transformation table shown in FIG. 21 much like the processing to add offset quantities and the processing to put an emphasis on each of the contrasts described earlier. That is, the component values (R2, G2, B2) of gradation data after transformation in the table created at the step S210 are now used as component values (R1, G1, B1) of the gradation data prior to trans formation. To put it in more detail, the existing component values (R2, G2, B2) of gradation data after transformation in the table created at the step S210 are input to find new component values (R2, G2, B2) of gradation data after transformation by using Eqs. (42) to (44). The new component values (R2, G2, B2) are then used to replace the existing component values (R2, G2, B2). In this way, by referencing the updated transformation table, the processing to carry out brightness is carried out at the same time as addition of the offset quantities found at the step S204 and the processing to put an emphasis on each of the contrasts found at the step S208.

Finally, at a step S216 of the flowchart shown in FIG. 6, transformation is carried out on the image data. Processing to obtain image data (Rm, Gm, Bm) after transformation from the image data (rm, gm, bm) prior to the transformation by referencing the transformation table shown in FIG. 21 is repeated for all picture elements.

In the present embodiment, the correction based on the offset quantities, the processing to put an emphasis on the contrast and the correction of the brightness are carried out in the order they are enumerated here. It should be noted, however, that they do not necessarily have to be all performed. In addition, the pieces of processing can be modified properly prior to the individual implementation.

For example, in the processing to put an emphasis on each of the contracts carried out by the embodiment described above, correction is made by using the transformation equations which represent linear relations with component values prior to the transformation. It should be noted, however, that in order to make the transformation smooth, the so-called S-curve transformation like one shown in FIG. 26 can also be performed. In this case, instead of judging the state of spreading of a picture-element-count distribution at the two end positions, it is possible to embrace the concept of the standard deviation representing the degree of dispersion of the picture-element-count distribution. The following is description of an example to put an emphasis on a contrast in accordance with an associative relation utilizing a standard deviation. It should be noted that, since all processing methods are common to the transformation based on picture-element-count distributions of color components, the luminance is taken as a representative statistical quantity and a procedure for obtaining the luminance Y after transformation from the luminance y prior to the transformation is explained.

While actually there are two concepts with regard to the standard deviation, in the present embodiment, processing is based on the following equation:

$$\sigma = \left\{ (1/n) \times \sum_{p=1}^{n} (yp - ym)^{}2 \right\} 1 \Big/ 2 \tag{45}$$

where yp: the pre-transformation picture-element luminance and ym: the average of values of the pre-transformation picture-element luminance The standard deviation represents the amount of spreading of a luminance distribution. In this sense of representing the amount of spreading of a luminance distribution, the slippage can also actually be used as well. In addition, since there are a total of 256 gradations as is the case with the present embodiment, the amount of spreading can also be found from the sharpness k of the luminance distribution.

$$k = \left\{ \sum_{p=1}^{n} (yp - ym)^{}4 \right\} \Big/ (n \times \sigma^{}4) \tag{46}$$

It should be noted that a statistical sharpness k of 3 corresponds to the amount of spreading of a normal distribution.

Figure 26:
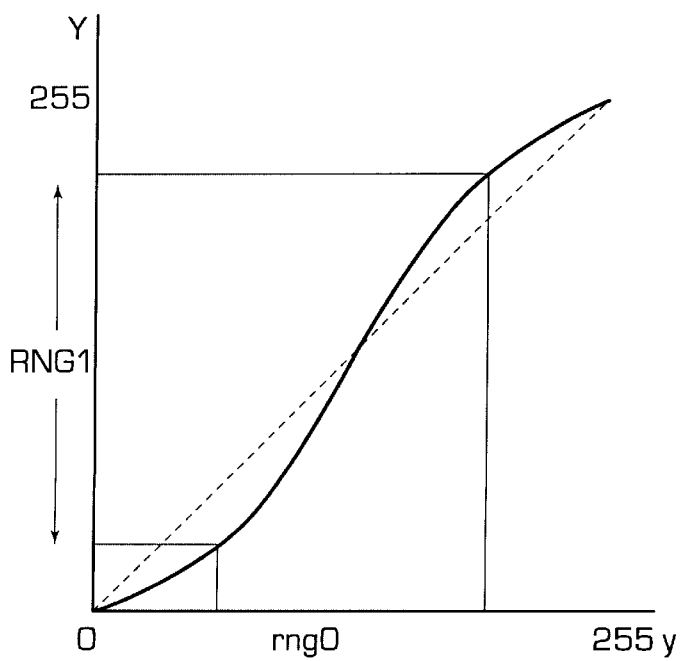
FIG. 26 is a diagram showing an S curve representing a relation between the input and the output of transformation processing to put an emphasis on the contrast of an image.

Based on the standard deviation σ which is found as described above to represent the amount of spreading of a luminance distribution, in the processing to put an emphasis on a contrast, many gradations are assigned to a range with a high distribution density and only few gradations are assigned to a range with a low distribution density. With an associative relation represented by the so-called S curve as shown in FIG. 26, a gradation range RNG1 assigned after transformation is wider than a gradation range rng0 assigned prior to the transformation, indicating that the number of gradations assigned after the transformation increases. As for ranges outside the gradation range rng0 on the low-luminance and high-luminance sides of the input, on the other hand, the gradation ranges assigned after the transformation becomes narrower.

In the present embodiment, the middle position ymid of the gradation range is the 128th gradation. γ correction is carried out by providing γ 1 for the gradation sub-range below the middle position ymid and providing γ 2 for the gradation sub-range above ymid. The values of γ 1 and γ 2 are determined from the standard deviation a by using the following equations:

$$\text{For } y \leq 128, \gamma 1 = (\sigma \text{std\_limit}/\sigma)^{**}fc \tag{47}$$

$$\text{For } y > 128, \gamma 2 = (\sigma/\sigma \text{std\_limit})^{**}fc \tag{48}$$

The above parameters are computed at the step S204 of the flowchart shown in FIG. 6. Notations σ std_limit and fc used in the above equations are parameters found from experiments by taking results of the transformation into consideration. In the present embodiment, the values of σ std_limit and fc are 128 and 0.1 respectively. Since the standard deviation σ located approximately has a value smaller than 128, for a large value of the standard deviation a in the above equations, γ 2 and γ 1 each approach unity, making the gradient of the S curve gradual. Such an S curve indicates that, in the case of a large amount of spreading, for the pre-transformation gradation range rng0 with its center coinciding with the middle position ymid, the post-transformation gradation range RNG0 is not so much widened. For a small value of the standard deviation σ in the above equations, on the other hand, γ 2 and γ 1 each depart from unity, making the gradient of the S curve steep. Such an S curve indicates that, in the case of a small amount of spreading, for the pre-transformation gradation range rng0 with its center coinciding with the middle position ymid, the post-transformation gradation range RNG0 is much widened. To put it in more concrete terms, such an S curve indicates that, in the case of image data with the luminance thereof distributed only over a narrow range, transformation to widen the range of the luminance is carried out.

Figure 27:
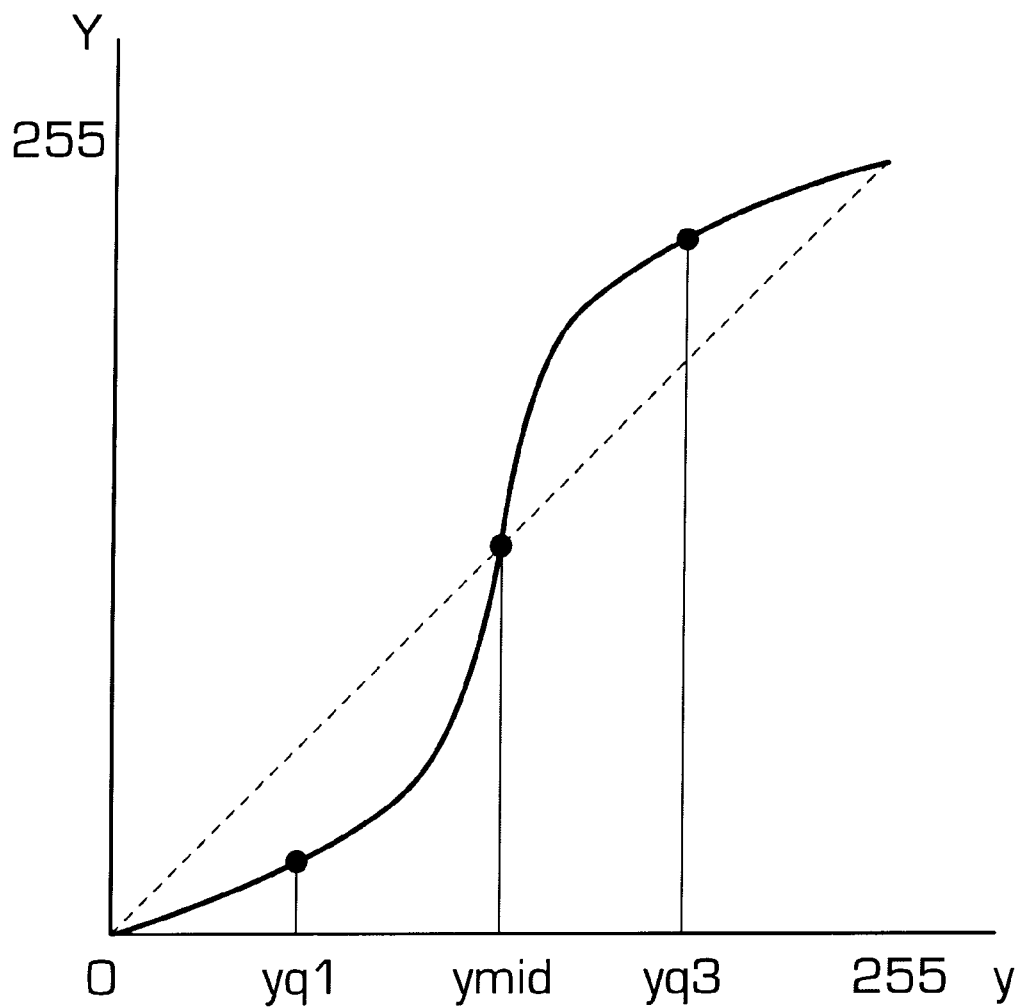
FIG. 27 is a diagram showing a transformation relation obtained by interpolation based on specific points of transformation.

In the present embodiment, the associative relation of the S curve is established by γ correction. In the case of an S curve shown in FIG. 27, five points on the y axis representing the luminance prior to the transformation, that is, the 0th gradation, he lower-side quarter point yq1, the middle point ymid, the upper-side quarter point yq3 and the 255th gradation are taken as reference points. At the 0th gradation, the middle point ymid and the 255th gradation, the luminance Y after transformation is made equal to the luminance y prior to the transformation (Y=y). Determination of transformation points, that is, the values of luminance Y after transformation, at the lower-side quarter point yq1 and the upper-side quarter point yq3 is based on standard deviations. Finally, an associative-relation curve connecting these five points is found by spline interpolation or Newton's interpolation. It is needless to say that the spline interpolation or Newton's interpolation can be applied to a portion of the curve. For example, the interpolation can be applied to a curve portion connecting the three points at the three reference points on the lower side: the middle point ymid, the lower-side quarter point yq1 and the 0th gradation. By the same token, the interpolation is applied to a curve portion connecting the three points at the three reference points on the upper side: the middle point ymid, the upper-side quarter point yq3 and the 255th gradation.

Figure 28:
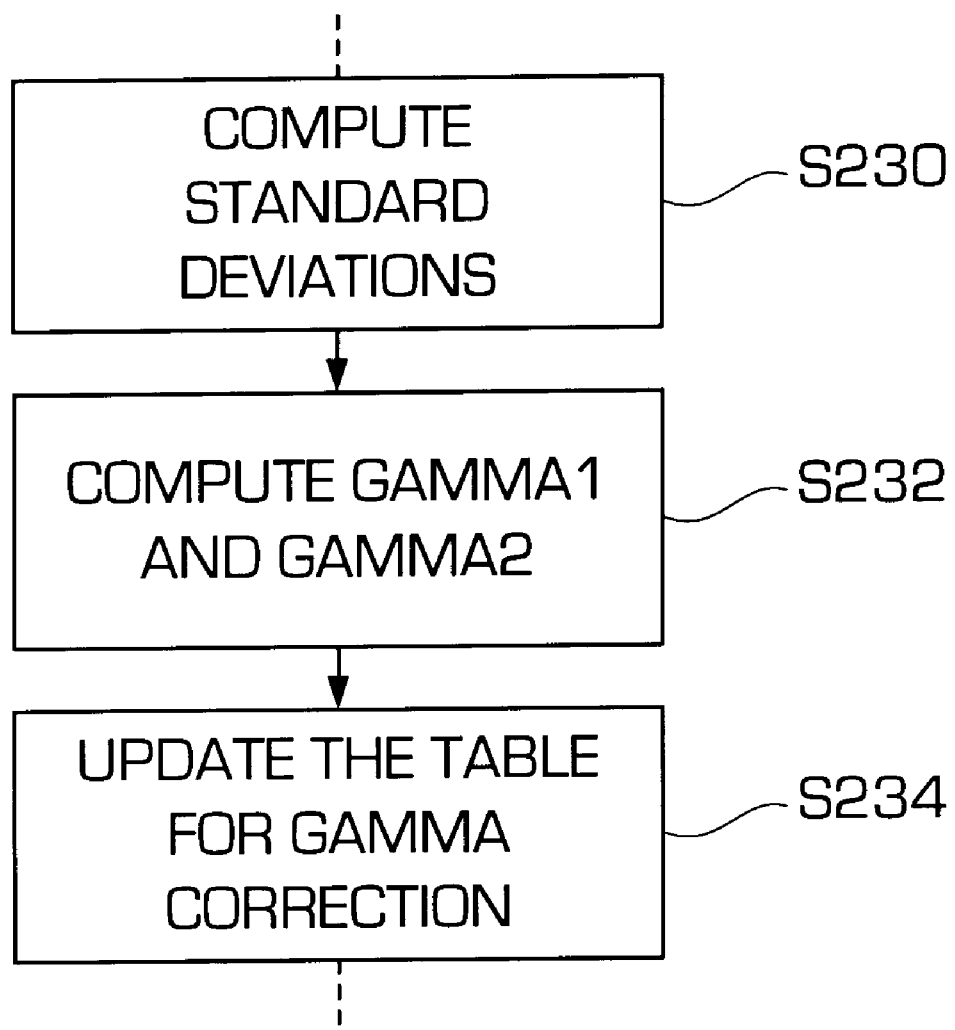
FIG. 28 is a flowchart representing part of processing to correct the contrast and the brightness of an image based on a relation represented by an S curve.

To put it in detail, as shown in a flowchart of FIG. 28, the standard deviations σ r, σ g and σ b of the color components are found at a step S230. At the following step S232, γ 1 and γ 2 for each of the color components are calculated. Finally, at a step S234, a transformation table based on an associative relation utilizing γ 1 and γ 2 is created. The pieces of processing of the steps S230 to S234 are executed in place of those of the steps S208 to S214 of the flowchart shown in FIG. 6.

The following is description of operations of the present embodiment having the configuration described above, following an order in which the operations are carried out.

When an image is taken by using an instrument such as the scanner 11 shown in FIG. 2, image data representing the image in terms of RGB gradation data is supplied to the computer 21. The CPU employed in the computer 21 executes an image processing program represented by the flowcharts shown in FIGS. 5 and 6, carrying out processing to correct the color reproducibility of the image data.

As shown in FIG. 5, the flowchart begins with the step S102 at which a thinning process is carried out on image data within a range prescribed by a predetermined allowable error to select picture elements and a picture-element-count distribution of the selected picture elements among gradations is found for each of the color components. Since the picture-element-count distributions can not be used as they are, however, at the following step S104, a judgment is formed to determine whether or not the image is a binary-data image such as a black-and-white image. Subsequently, at the step S108, a judgment is formed to determine whether or not the image is a natural picture. Unless the image is a binary-data image or not a natural picture, the flow of processing goes on to the step S110 to form a judgment as to whether or not the image includes a frame. If the image includes a frame, the frame is removed. Then, the flow of processing proceeds to the step S114 at which unclear zones at the two ends of the picture-element-count distribution are taken out. In this state, a characteristic vector representing the picture-element-count distribution of each of the color components is found. Then, the flow of processing proceeds to the step S116 at which inner products of the characteristic vectors for each two color components are found to check the degree of analogy among the picture-element-count distributions. Picture-element-count distributions of the color components very dissimilar to each other are an evidence indicating that the balance of color is shifted deliberately in the original image data, making it unnecessary to carry out processing to uniform the characteristics. If comparison with a predetermined threshold value indicates that analogy is observed to a certain degree, however, the balance of color is judged to be shifted inadvertently. In this case, the following processing shown in FIG. 6 to uniform the characteristics is carried out.

At the step S204 of the flowchart shown in FIG. 6, offsets dR and dB for the red-color and blue-color components respectively relative to the green-color component are found by using the upper-end and median gradations of the picture-element-count distributions. At the following step S206, an initial transformation table for use in the final transformation of the image data is created. Subsequently, at the step S208, parameters for putting an emphasis on the contrast are found and the contrast of each of the color components is made uniform. At the next step S210, while the parameters are being used for putting an emphasis on the contrast, the transformation table is updated for adjusting the balance of contrast among the color components. Then, at the step S212, parameters of the γ correction for uniforming the degrees of brightness of the color components are calculated and the transformation table for implementing the γ correction is re-updated into a final transformation table.

Finally, at the step S216, transformation is carried out on the image data for all picture elements by referring to the final transformation table created so far.

At the first step S202 of the flowchart shown in FIG. 6, a judgment is formed to determine whether or not analogy exists and a decision based on the existence of analogy is made to determine whether or not the pieces of processing represented by the flowchart shown in FIG. 6 described so far are to be carried out. When the processing represented by the flowchart shown in FIG. 31 is carried out, effective values, that is, offset quantities, are changed in accordance with the degree of analogy, causing in essence the processing to uniform characteristics to be performed or not to be performed.

It is needless to say that, if the image is an image such as a binary-data image or an image other than a natural picture described above, the processing represented by the flowchart shown in FIG. 31 is not carried out. With the image processing provided by the present invention carried out, however, even in the case of image data with poor color reproducibility due to color slippages caused by an image inputting apparatus used for inputting a photograph, quantities such as the color slippage, the contrast and the brightness are made uniform for each of the color components and, at the same time, an emphasis is put on the contrast, making it very easy to obtain a well pitched and good image.

In the embodiment described above, some parameters are set at fixed values. It should be noted that, however, that the user can select values of the parameters through a predetermined GUI of the computer 21.

As described above, at the step S102 of the flowchart shown in FIG. 5, the picture-element-count distribution of each of the color components is found for image data by adopting a method such as the thinning technique and, at the step S116, a judgment as to whether analogy exists among the picture-element-count distribution is formed. If the degree of analogy is not low, characteristics identified from the picture-element-count distributions are judged to naturally match each other from the beginning. In this case, color slippages are corrected in the pieces of processing carried out at the steps S204 to S216 of the flowchart shown in FIG. 6 by correcting offsets, putting an emphasis on the contrast of each color component and correcting the brightness so that a well pitched and good image can be obtained even from image data with poor color reproducibility. In addition, since the processing is automated, even an untrained operator can correct the balance of color with ease. At the step S205 of the flowchart shown in FIG. 31, offset quantities are corrected in accordance with a degree of analogy to be used in correction of color slippages.

Second Embodiment

Next, a second embodiment provided by the present invention is explained.

The present embodiment comprises the steps of:

1. determining proper brightness for forming a judgment on color slippages from actual image data;
2. obtaining components of the brightness;
3. computing color slippages; and
4. carrying out processing to correct the color slippages found at the above step in order to individually correct component values of gradation-color-specification data so as to absorb the color slippages.

It is needless to say that the above pieces of processing are carried out by the image processing apparatus 20. In this sense, the image processing apparatus 20 comprises a color-slippage computing means and a color-slippage correcting means as shown in FIG. 33.

Figure 34:
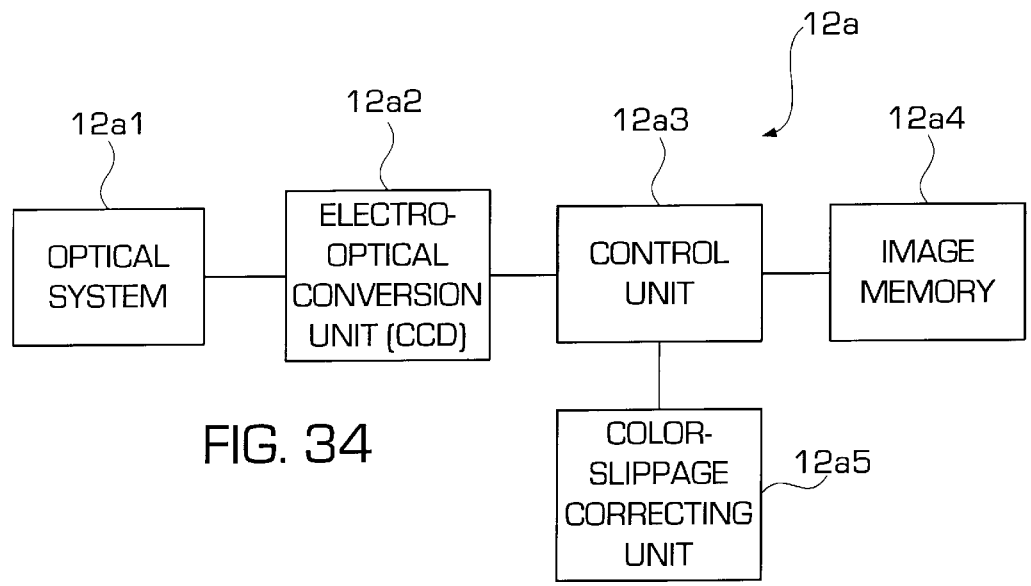
FIG. 34 is a block diagram of a digital still camera, an application in which the image processing apparatus provided by the present invention is used.

In the present embodiment, a computer system for processing an image is incorporated between the image inputting apparatus and the image outputting apparatus. It should be noted, however, that the computer system is not always required. For example, in a digital still camera 12a shown in FIG. 34, an image processing apparatus for correcting color slippages is incorporated. As shown in the figure, the digital still camera 12a has an image pickup unit comprising an optical system 12a1 and an electro-optical conversion unit 12a2 implemented typically by a CCD. The digital still camera 12a also includes an image memory unit 12a4, a color-slippage correcting unit 12a5 and a control unit 12a3 for controlling conversion of an optical image into a digital image which can then be stored in the image memory unit 12a4. The color-slippage correcting unit 12a5 is used for correcting color slippages included in image data. In such a case, the color-slippage correcting unit 12a5 is implemented by hardware such as an LSI or software.

Figure 35:
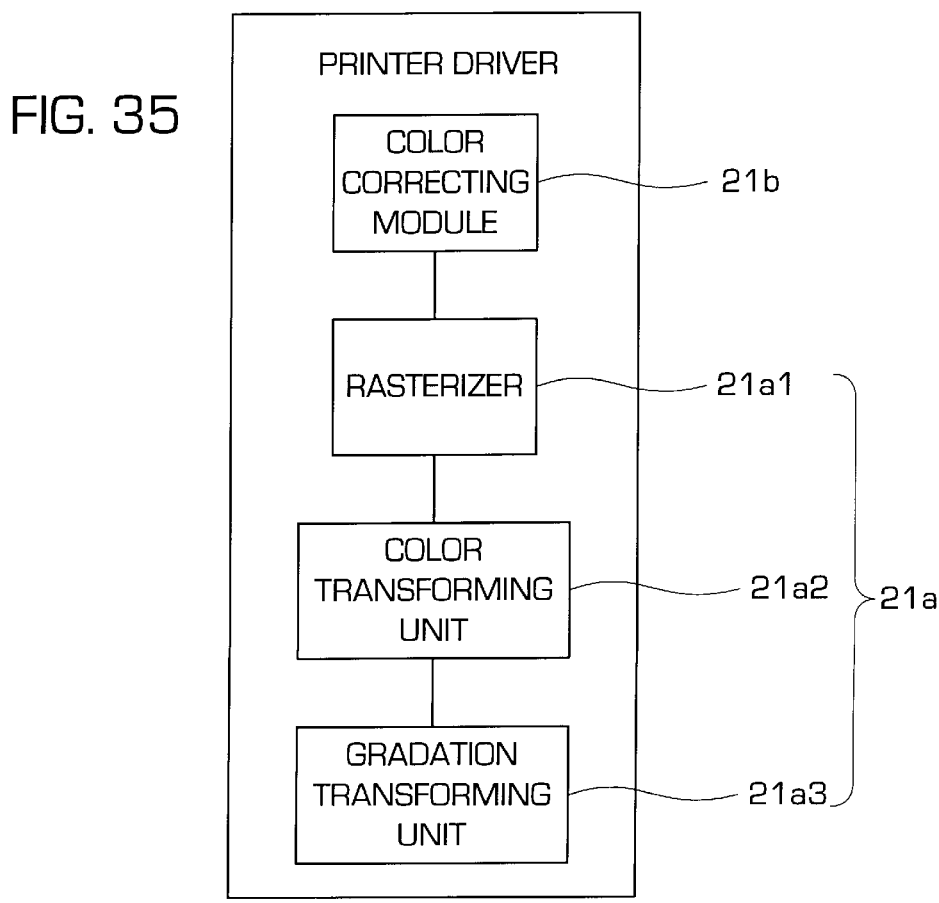
FIG. 35 is a diagram showing the configuration of a printer driver, another application in which the image processing apparatus provided by the present invention is used.

In addition, color slippages can be absorbed on the output side regardless of the input equipment. For example, a printer driver shown in FIG. 35 comprises a rasteriser 21a1 for cutting out a scanning range of a printing head employed in the printer from image data output by a printing application, a color transforming unit 21a2 for transforming RGB gradation-color-specification data into CMY gradation-color-specification data by referring to a color transformation table for all picture elements in the scanning range and a gradation transforming unit 21a3 for transforming gradations of the CMY gradation-color-specification data into those of binary data as is the case with an ordinary printer driver. However, a color correcting module 21b for correcting color slippages of image data is included at a stage in front of the rasteriser 21a1. By having such a configuration, image data can be printed with problems of color slippages solved at the printing time without regard to what image data has been supplied to the printer.

Figure 36:
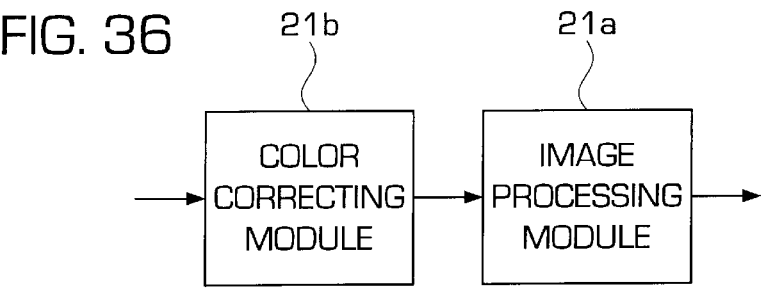
FIG. 36 is a diagram showing an order in which pieces of processing are carried out in the image processing apparatus provided by the present invention.
Figure 37:
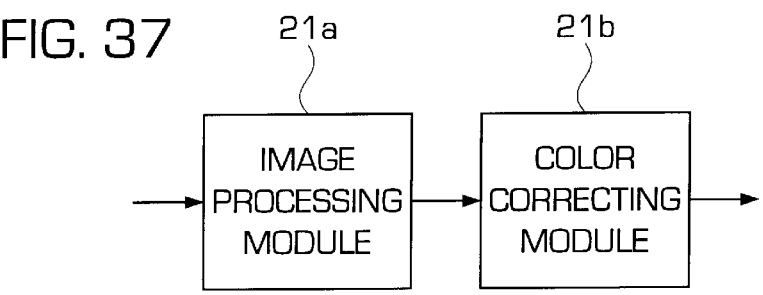
FIG. 37 is a diagram showing another order in which pieces of processing are carried out in the image processing apparatus provided by the present invention.

FIGS. 36 and 37 are diagrams each showing an order of implementation of a color correcting module employed in a configuration wherein the color correcting module is considered as a module separated from other image processing modules. In the configuration shown in FIG. 35, the color correcting module 21b precedes the other image processing modules 21a, that is, the rasteriser 21a1, the color transforming unit 21a2 and the gradation transforming units 21a3, as is the case with the configuration shown in FIG. 36. As an alternative embodiment, the color correcting module 21b can be placed at a stage following the image processing module 21a as shown in FIG. 37. If the image processing is merely color transformation from the RGB into the CMYK, it will be sufficient to find color slippages for the CMYK gradation-color-specification data even though it is not suitable for a printer driver wherein the output is print data of two gradations. Since the CMYK gradation-color-specification data comprises all but equal color component values, the color slippages can be found and corrected by adopting the same methods.

Figure 38:
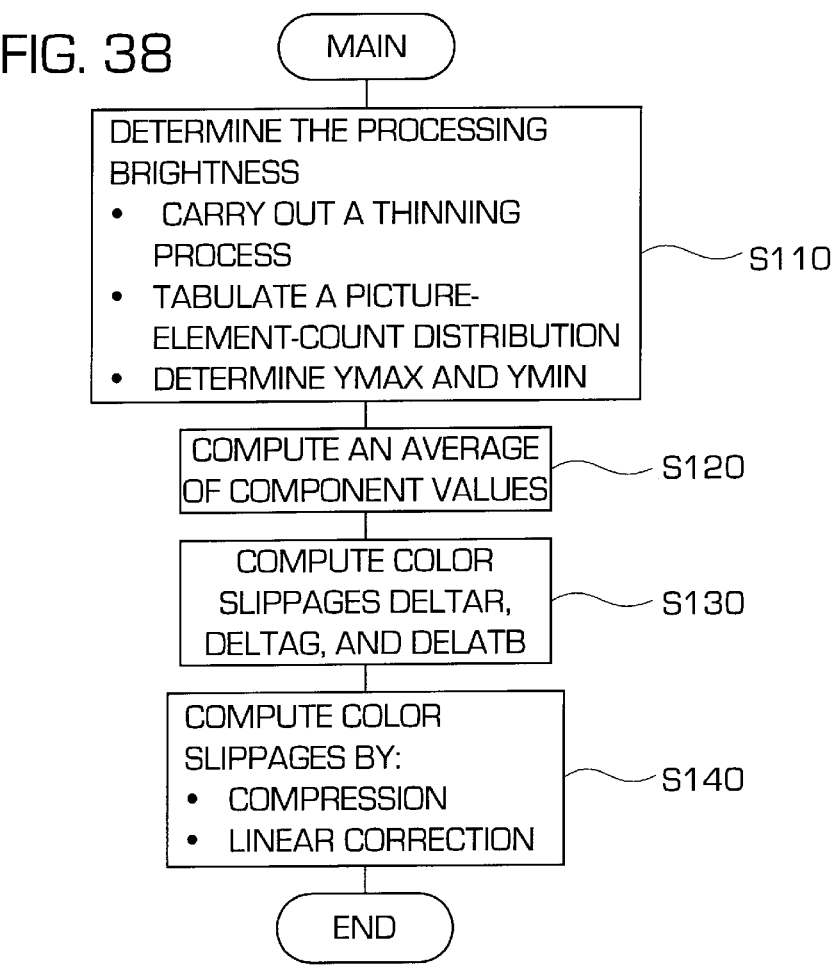
FIG. 38 is a flowchart representing processing to correct a color slippage by the image processing apparatus provided by the present invention.

The following is description of an actual image processing program executed by the computer 21 with reference to a flowchart shown in FIG. 38.

As shown in the figure, the flowchart begins with a step S410 at which a process to determine processing brightness is carried out. The process to determine processing brightness is carried out to identify a range of brightness that is proper for forming judgment on color slippages from real image data. The process comprises thinning processing, brightness-tabulation processing and brightness-determination processing.

Figure 39:
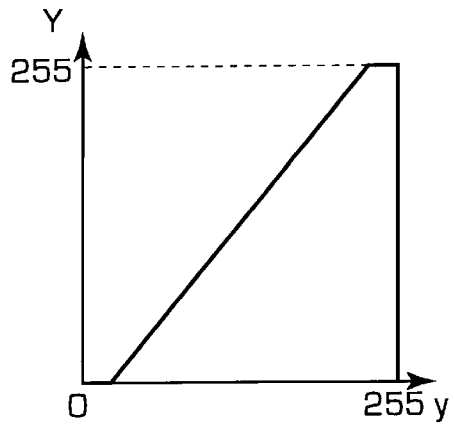
FIG. 39 is a graph showing a characteristic of image data.
Figure 40:
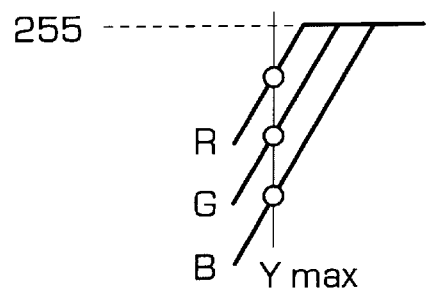
FIG. 40 is a graph showing a state of slippages among color-component values at a high-brightness zone.
Figure 41:
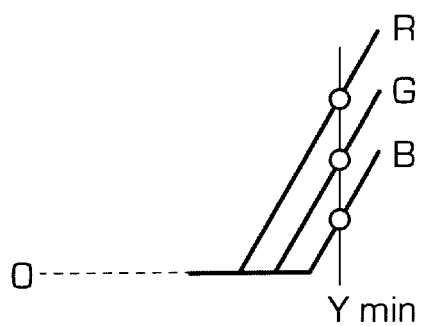
FIG. 41 is a graph showing a state of slippages among color-component values at a low-brightness zone.

In detection of a color slippage in a low-brightness or high-brightness area, there is a relation between the brightness y of a real image which serves a source of image data and the brightness Y of the image data shown in FIG. 39. As shown in the figure, in the low-brightness or high-brightness area, the brightness Y of the image data gets saturated with respect to the brightness y of a real image due to characteristics of the image inputting apparatus. That is, at brightness values y higher than a certain value, the brightness Y reaches a maximum while, at brightness values y lower than another certain value, the brightness Y becomes a minimum. Here, color slippages are generated at equipment such as the image inputting apparatus 10 due to small slippages among the RGB component values for non-chroma black and white colors as shown in FIGS. 40 and 41. In the saturated zones, however, slippages among the RGB component values disappear. For this reason, it is meaningless to observe component values merely at the maximum and minimum brightness values. If a brightness on the inner side at a predetermined uniform difference in brightness from the maximum or minimum brightness value is used as a reference, on the other hand, whether the image data under observation means a white or black color is indeterminate.

Figure 42:
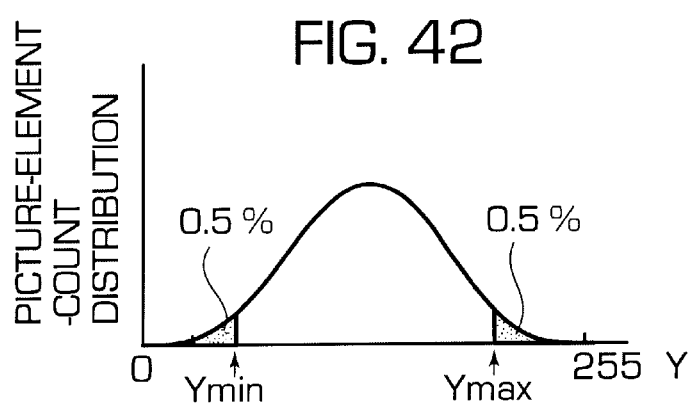
FIG. 42 is a diagram showing a range of processing brightness obtained for a picture-element-count distribution.

In the present embodiment, in this sense, a brightness distribution like one shown in FIG. 42 is found. Noise and saturated zones are eliminated. In addition, a brightness having a maximum or minimum value which can be inferred to imply a white or black color is found. In the process to determine processing brightness, first of all, a thinning process to extract sampling-object picture elements is carried out by using the same method as the one described earlier.

Then, a brightness distribution is tabulated at the same time as the thinning process. It should be noted, however, that picture-element data of picture elements selected in this way does not have to include information on brightness as a component element. In the low-brightness or high-brightness zone, the RGB component values in a mutually equal relation for representing the white or black color should approach a maximum or minimum value and the objective is to find their slippages. Thus, in this case, accurate brightness is not required. Addressing this condition, a brightness yp at a point P is found on the basis of Eq. (2) given earlier. It should be noted that, if merely an approximate value of the brightness yp needs to be calculated, the following equation which does not take the addition weight of each component into consideration can be used:

$$yp=(Rp+Gp+Bp)/3 \tag{53}$$

The expression on the right-hand side of Eq. (53) is simplified in comparison with that of Eq. (2).

In the tabulation of a brightness distribution, the brightness range is set as a range of integers from 0 to 255. The degree of brightness of a sampled picture element is found and expressed in terms of an integer. The number of picture elements with an equal degree of brightness is counted and associated with the degree of brightness which is expressed by one of the integers in the range 0 to 255. In actuality, an array of variables having subscripts ranging from 0 to 255 are provided. The variables are each used for storing a picture-element count resulting from the counting of the number of picture elements with an equal degree of brightness. To put it in detail, each time a picture element having a certain degree of brightness is encountered, the value of the variable with a subscript indicated by the degree of brightness is incremented by one.

After a brightness distribution is tabulated in this way, a degree of brightness Ymax is determined at such a position on the upper side of the brightness range that the sum of picture-element counts for degrees of brightness higher than Ymax is equal to 0.5% of the total number of sampled picture elements. In the present embodiment, color slippages are tabulated at the brightness Ymax on the upper side of the brightness range. When color slippages in the low-brightness zone are also to be detected, a degree of brightness Ymin is determined at such a position on the lower side of the brightness range that the sum of picture-element counts for degrees of brightness lower than Ymin is equal to 0.5% of the total number of sampled picture elements. FIG. 42 is a diagram showing Ymax and Ymin obtained by shifting brightness points toward the mid position from the upper and lower end of the brightness range respectively. As shown in the figure, Ymax and Ymin serve as limits of hatched zones each having an area equal to 0.5% of the total area enclosed by the distribution curve and the Y axis on the upper and lower sides of the brightness range respectively. By avoiding saturated zones in this way, it is possible to obtain brightness at which color slippages are recognized as shown in FIGS. 40 and 41.

The flow of processing represented by the flowchart shown in FIG. 38 then goes on to a step S420 at which an average of component values at the upper-limit brightness Ymax and an average of component values at the lower-limit brightness Ymin are computed. To put it in detail, an average of degrees of brightness of a color component for picture elements of the image data contributing to the upper-limit brightness Ymax and an average of degrees of brightness of a color component for picture elements of the image data contributing to the lower-limit brightness Ymin are calculated. In the case of the present embodiment, two passes of processing are thus executed. In the first pass, the degrees of processing brightness are determined after tabulating a picture-element-count distribution. Then, in the second pass, image data is again searched for data providing the degrees of brightness in order to calculate the averages described above.

For outstanding luminance observed at the sampling time, on the other hand, the degrees of brightness contributing to the outstanding luminance for each color component can be added up in order to compute an average without going through the two passes. For example, let us set forth a premise that the upper-limit brightness Ymax seems to settle at a value in the range 231 to 255. In this case, when a degree of brightness is found at a sampling time to be in this range, a product of the degree of brightness for a color component and the picture-element count at the degree of brightness is cumulated in an array variable associated with the degree of brightness for the color component. Then, when the value of the processing brightness has been finally determined, the cumulated total of such products for each color component is divided by a picture-element count at the processing brightness in order to find an average degree of brightness for each color component.

In the present embodiment, a general average is used as a representative value. It should be noted, however, that a representative value is not limited to a general average. For example, a maximum and a minimum of image data for each color component at an equal degree of brightness are found in order to determine a middle value which can be used as a representative value. In a word, an attempt is made to find a color slippage generated in the image inputting apparatus from representative values for the color components at a certain degree of brightness.

The flow of processing represented by the flowchart shown in FIG. 38 then goes on to a step S430 at which color slippages Δ R, Δ G and Δ B are found from average values Rav, Gav and Bav of the RGB color components respectively by using the following equations:

$$\Delta R = Rav - Ymax \tag{54}$$

$$\Delta G = Gav - Ymax \tag{55}$$

$$\Delta B = Bav - Ymax \tag{56}$$

Thus, color slippages can each be considered as a difference from the processing brightness as shown in the formulas for computing the color slippages. As a possible alternative method, for example, a color slippage can be considered for example as a clog raiser of another component value relative to a maximum of component values.

Then, the flow of processing proceeds to a step S440 at which image data is corrected by using the color slippages Δ R, Δ G and Δ B.

By the way, when the color slippages Δ R, Δ G and Δ B are applied to component values of image data in a process to correct the image data to be described later, an excessively corrected result is obtained. Even though it is no more than a matter of human sense, in order to obtain a better result, the color slippages Δ R, Δ G and Δ R can be compressed by using the following equations:

$$\delta R = \Delta R / a \quad (57)$$

$$\delta G = \Delta G / a \quad (58)$$

$$\delta B = \Delta B / a \quad (59)$$

where notation a is a parameter having a value in the range 3 to 4. The compression of color slippages obtained arithmetically as described above can be said to be a sort of technique of correction to be applied to image data rather than just compensation for errors generated in a process of finding the color slippages. Thus, the compressed color slippages are determined at the same time as the correction of the color slippages described as follows.

When applying the correction quantities δ R, δ G and δ B to image data with an upper-limit brightness Ymax, the correction quantities should vary linearly so that, for RGB component values of (0, 0, 0), the correction quantities are each a zero. Let i (i=0 to 255) represent a component value. In this case, the correction quantities δ R(i), δ G(i) and δ B(i) are expressed as follows:

$$\delta R(i) = \delta R \times i / Rav \quad (60)$$

$$\delta G(i) = \delta G \times i / Rav \quad (61)$$

$$\delta B(i) = \delta B \times i / Rav \quad (62)$$

Thus, for a point P with component values (Rp, Gp, Bp), the component values are corrected as follows:

$$Rp = Rp + \delta R(Rp) \quad (63)$$

$$Gp = Gp + \delta G(Gp) \quad (64)$$

$$Bp = Bp + \delta B(Bp) \quad (65)$$

The above correction will result in a beautiful image including no color slippages. It should be noted that the relations expressed by Eqs. (63) to (65) are also applicable to the RGB gradation values in a uniform manner. As a result, by creating a transformation table for all gradation values in advance, image data can be transformed at a high speed.

In the present embodiment, only color slippages in the so-called high-brightness area are taken into consideration. This is because, as described earlier, an effect of color slippages in this range can be said to be in conformity with reality. As described above, however, since color slippages in the low-brightness area can also be found as well, color slippages can be corrected by applying color-slippage quantities obtained for the high-brightness and low-brightness areas. Let Dmax be a color-slippage quantity at Ymax and Dmin be a color-slippage quantity at Ymin. In this case, a correction quantity D(i) for the component value i is expressed by Eq. (66) as follows:

$$D(i) = (Dmax - Dmin)(i - Ymin) / (Ymax - Ymin) + Dmin \quad (66)$$

It is needless to say that, with the correction quantity set by the above equation, the parameter used in the compression equations can be properly adjusted to another value.

Next, the operation of the embodiment having the configuration described above is explained by referring to the flowchart shown in FIG. 38 as follows.

When color slippage s are corrected in the digital still camera 12, image data taken by the digital still camera 12 is supplied to the computer 21. At the step S410, a brightness distribution is tabulated for the image data by carrying out a predetermined thinning process. When the brightness distribution has been tabulated, a degree of brightness Ymax is set. As described earlier, the sum of picture-element counts for degrees of brightness between Ymax and the highest degree of brightness in the brightness range is equal to 0.5% of the total number of all sampled picture elements. The flow of processing then goes on to the step S420 at which average values Rav, Gav and Bav for the RGB color components are found. At the following step S430, color slippages Δ R, Δ G and Δ B, that is, differences between the average values Rav, Gav and Bav and the degree of brightness Ymax, for the RGB color components are found. After the color slippages Δ R, Δ G and Δ B have been found, the flow of processing continues to the step S440 at which the color slippages are compressed and distributed linearly among all gradation values as applied correction quantities to be reflected in the image data.

It is needless to say that, by carrying out the same processing on image data read in through the scanner 11, color slippages generated in the scanner 11 can be corrected. By the same token, such color slippages of an image input to the video camera 14 can be computed for each scene by taking variations due to hardware aging into consideration and used to create a transformation table by supposing that a similar trend exists in the scene and, at the same time, image data is transformed for each frame by referring to the transformation table. It is needless to say that, if the processing speed is sufficiently high, transformation can be carried out for each plurality of frames and the same transformation can also be performed on the receiver side as well.

As described above, in the case of gradation-color-specification data having component values in an all but equal relation, in the low-brightness and high-brightness areas, image data represents a white or black color. In such an area, there is a circumstance wherein component values are regarded as basically equal so that a judgment on a color slippage can be made by using a difference in component value. Under such a background, a processing brightness of a range where image data does not get saturated is determined at the step S410, an average for each component value at the processing brightness is calculated at the step S420, a color slippage is calculated as a difference between the processing brightness and the average value at the step S430 and the color slippage is reflected in the image data at the step S440.

What is claimed is:

1. An image processing apparatus for carrying out predetermined transformation processing on an input comprising component values of image data produced as gradation-color-specification data composed of color components of an image, thereby representing said image as a set of picture elements arranged to form a dot matrix, producing an output from said transformation processing and carrying out transformation based on a relation between said input and said output to correct a balance of color, said image processing apparatus employing a characteristic uniforming means wherein a distribution of said gradation-color-specification data is found for each of said color components, said characteristic uniforming means treats only picture elements approximated by said gradation-color-specification data for each of said color components as an object for finding said distribution, a slippage among said color components is recognized and said recognized slippage is used as a basis for making characteristics uniform among said color components.

2. An image processing apparatus according to claim 1 wherein said characteristic uniforming means finds said characteristics from predetermined positions at said distributions, computes offset quantities for slippages among said color components and uses said offset quantities for correction of values of said color components in order to make said characteristics uniform.

3. An image processing apparatus according to claim 2 wherein said characteristic uniforming means treats end positions of the range of each of said distributions as a characteristic of said distribution.

4. An image processing apparatus according to claim 2 wherein said characteristic uniforming means treats a position approximately at the center of the range of each of said distributions as a characteristic of said distribution.

5. An image processing apparatus according to claim 1 wherein said characteristic uniforming means makes degrees of spreading of said distributions all but uniform among said color components.

6. An image processing apparatus according to claim 5 wherein said characteristic uniforming means increases a degree of spreading of each of said distribution by shifting the ends of said distribution outward over an effective gradation range.

7. An image processing apparatus according to claim 5 wherein said characteristic uniforming means uses said degrees of spreading of said distributions as a basis for allocating a large number of gradations to a range with a high distribution density and allocating a small number of gradations to a range with a low distribution density.

8. An image processing apparatus according to claim 1 wherein said characteristic uniforming means makes degrees of brightness based on each of said distributions all but uniform among said color components.

9. An image processing apparatus according to claim 8 wherein said characteristic uniforming means forms a judgment as to whether an image is bright or dark by comparing a gradation approximately at the center of the range of each of said distributions with a predetermined gradation.

10. An image processing apparatus according to claim 8 wherein said characteristic uniforming means makes degrees of brightness of an image uniform among said color components by carrying out $\gamma$ correction based on an outcome of said judgment as to whether said image is bright or dark.

11. An image processing apparatus according to claim 1 wherein said characteristic uniforming means includes a correction control means for finding a degree of analogy among said distributions of said color components and bypassing said transformation processing in case said degree of analogy has a small value.

12. An image processing apparatus according to claim 11 wherein said correction control means divides a gradation range that said gradation-color-specification data can have, into a plurality of sub-ranges and finds a degree of analogy among said color components by compring partial distributions of a color component with those of another color component in the same sub-ranges.

13. An image processing apparatus according to claim 11 wherein said correction control means sets a characteristic vector to represent each of said distributions with said sub-ranges of said distribution of said characteristic vector each serving as a member of said characteristic vector representing said distribution and finds a degree of analogy among said color components from inner products of said character vectors.

14. An image processing apparatus according to claim 11 wherein said characteristic uniforming means provides an effective value for making a decision as to whether or not to make said characteristics uniform and said correction control means in essence makes a decision as to whether or not to make said characteristics uniform by varying said effective value, and makes said effective value continuously variable.

15. An image processing apparatus according to claim 1 wherein said characteristic uniforming means has a color-slippage computing means for finding a color slippage of said gradation-color-specification data from slippages in value among said color components in low-brightness and high-brightness zones in said gradation-color-specification data.

16. An image processing apparatus according to claim 15 wherein said color-slippage computing means forms a judgment on said color slippage based on a slippage in value among said color components in said high-brightness zone.

17. An image processing apparatus according to claim 15 wherein said color-slippage computing means forms a judgment on said color slippage by finding a slippage in value among said color components at the same degree of brightness.

18. An image processing apparatus according to claim 15 wherein said color-slippage computing means finds a representative value representing said gradation-color-specification data for each of said color components for a degree of brightness at which a color slippage is found and regards a difference between said representative value and said degree of brightness as a color slippage.

19. An image processing apparatus according to claim 15 wherein said color-slippage computing means tabulates a brightness distribution for said gradation-color-specification data and finds a slippage in value among said color components at a degree of brightness of a point shifted inward from an end of a reproducible range of said brightness distribution by a distance determined by a predetermined distribution ratio.

20. An image processing apparatus according to claim 15 wherein said characteristic uniforming means has a color-shift correcting means for compressing a detected color slippage and using said compressed color slippage in correction of a component value.

21. An image processing apparatus according to claim 20 wherein said color-shift correcting means adapts a color slippage found at a predetermined gradation for each gradation value and uses said adapted color slippage for correction of a component value.

22. An image processing method for carrying out predetermined transformation processing on an input comprising component values of image data produced as gradation-color-specification data composed of color components of an image, thereby representing said image as a set of picture elements arranged to form a dot matrix, producing an output from said transformation processing and carrying out transformation based on a relation between said input and said output to correct a balance of color, said method comprising the steps of:

finding a distribution of said gradation-color-specification data for each of said color components;

treating only picture elements approximated by said gradation-color-specification data for each of said color components as an object for finding said distribution;

recognizing a slippage among said color components; and using said recognized slippage as a basis for making characteristics uniform among said color components.

23. A medium for storing an image processing program for carrying out predetermined transformation processing on an input comprising component values of image data produced as gradation-color-specification data composed of color components of an image, thereby representing said image as a set of picture elements arranged to form a dot matrix, producing an output from said transformation processing and carrying out transformation based on a relation between said input and said output to correct a balance of color, said program comprising the steps of:

finding a distribution of said gradation-color-specification data for each of said color components;

treating only picture elements approximated by said gradation-color-specification data for each of said color components as an object for finding said distribution;

recognizing a slippage among said color components; and using said recognized slippage as a basis for making characteristics uniform among said color components.

* * * * *